United States Patent [19]

Babbitt et al.

[11] Patent Number: 5,239,548
[45] Date of Patent: Aug. 24, 1993

[54] OPTICAL SIGNAL PROCESSOR FOR PROCESSING CONTINUOUS SIGNAL DATA

[75] Inventors: William R. Babbitt, Bellevue; John A. Bell, Issaquah, both of Wash.

[73] Assignee: The Boeing Company, Seattle, Wash.

[21] Appl. No.: 785,798

[22] Filed: Oct. 31, 1991

[51] Int. Cl.$^5$ ............................................. H01S 3/10
[52] U.S. Cl. .................................. 372/26; 359/561
[58] Field of Search .............. 372/26; 359/560, 561; 369/60, 61, 121, 124, 272

[56] References Cited

U.S. PATENT DOCUMENTS

| | | |
|---|---|---|
| 3,896,420 | 7/1975 | Szabo . |
| 4,101,976 | 7/1978 | Castro et al. . |
| 4,103,346 | 7/1978 | Haarer et al. . |
| 4,306,771 | 12/1981 | Bjorklund . |
| 4,459,682 | 7/1984 | Mossberg . |
| 4,533,211 | 8/1985 | Bjorklund et al. . |
| 4,670,854 | 6/1987 | Mossberg et al. . |
| 4,948,212 | 8/1990 | Cheng et al. ............. 359/561 |
| 4,961,615 | 10/1990 | Dwechko et al. ......... 359/561 |

OTHER PUBLICATIONS

L. Allen and J. H. Eberly, *Optical Resonance and Two-Level Atoms*, 1975, Chapter 9.
T. W. Mossberg, "Time-domain frequency-selective optical data storage" Opt. Letter, 7, 77 (1982).
W. R. Babbitt, Y. S. Bai, and T. W. Mossberg, "Convolution, correlation and storage of optical data in inhomogeneously broadened absorbers," vol. 639, Advances in Optical Information Processing II Apr. 1986).
W. R. Babbitt, "The Response of Inhomogeneiously Broadened Optical Absorbers to Temporally Complex Light Pulses," Ph.D. Thesis, Harvard University, Nov. 1987, Univ. Microfilms, Ann Arbor, MI.
Y. S. Bai, W. R. Babbitt, and T. W. Mossberg, "Coherent transient optical pulse-shape storage/recall using frequency-swept excitation pulses," Opt. Lett. 11, 724 (1986).
R. M. Macfarlane and R. M. Shelby, "Sub-kilohertz optical linewidths of the $^7F_o - ^5D_o$ transition in $Y_2O_3$:$Eu^{3+}$," Opt. Commun. 39, 169 (1981).
W. R. Babbitt and T. W. Mossberg, "Time-domain frequency-selective optical data storage in a solid-state material," Opt. Commun. 65, 185 (1988).
W. W. Moerner, "Molecular electronics for frequency domain optical storage: Persistent spectral hole-burning," J. Molec. Elec. 1, 55 (1985).
"Frequency domain optical storage and other applications of persistent spectal hole-burning," Chapter 7 in Persistent Spectral Hole-Burning: Science and Applications, W. E. Moerner, Ed., Topics in Current Physics, vol. 44, Springer-Verlag, 1988.
Y. S. Bai, W. R. Babbitt, N. W. Carlson, and T. W. Mossberg, "Real-time optical waveform convolver/cross correlator," Appl. Phys. Lett. 45, 714 (1984).
K. P. Jackson and H. J. Shaw, "Fiber-optic delay-line signal Processors," Chapter 7.1 in Optical Signal Processing, Ed. Joseph L. Horner (1987).
R. M. Macfarlane and R. M. Shelby, "Homogeneous line broadening of optical transitions of ions and molecules in glasses," J. Lum. 36, 179 (1987).
A. Winnacker, R. M. Shelby, and R. M. Macfarlane, "Photon-gated hole burning: a new mechanism using two-step photoionization," Opt. Latt. 10, 350 (1985).
J. A. Bell and W. R. Babbitt, "Phase and frequency sensitive signal processing using stimulated photon echoes," Conference on Lasers and Electro-Optics, Anaheim, Calif., May 21-25, 1990, 1990 Technical Digest Series, vol.7, pp. 420–421.

*Primary Examiner*—John D. Lee
*Assistant Examiner*—Robert E. Wise
*Attorney, Agent, or Firm*—Foley & Lardner

[57] ABSTRACT

An electromagnetic signal processor which uses an inhomogeneously broadened absorbing material to store data for long periods of time and which is able to process an uninterrupted signal. A spectral interference pattern created by the interference of at least two input pulses of electromagnetic radiation is stored in the absorbing medium. The pattern is fixed in the medium to allow for uninterrupted processing of signal data. The fixed pattern employed in such a processor could be reprogrammed by either reversing the gating process used to program the absorbing medium or by spatially directing the electromagnetic beams to a different portion of the material.

37 Claims, 12 Drawing Sheets

WRITE

READ

WRITE

READ

WRITE

READ

FIG. 15A
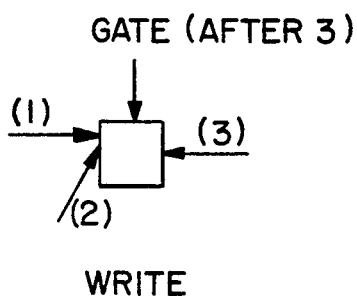
WRITE
FIG. 15B
(4) (s)
READ
$\bar{k}_1 = -\bar{k}_3$
$\bar{k}_2 = \bar{k}_4$
$\bar{k}_s = -\bar{k}_4$
$\bar{k}_1 \neq \bar{k}_2$
FIG. 16A
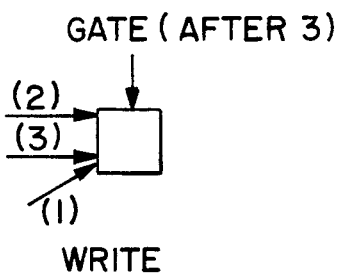
WRITE
FIG. 16B
(4) (s)
READ
$\bar{k}_2 = \bar{k}_3 = \bar{k}_4$
$\bar{k}_s = \bar{k}_1 \neq \bar{k}_2$
FIG. 17A
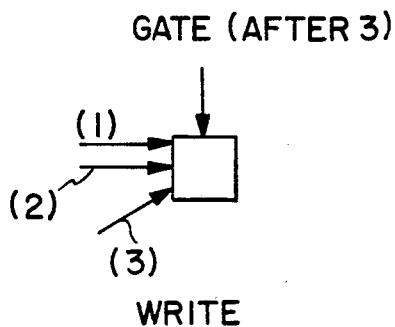
WRITE
FIG. 17B
(4) s
READ
$\bar{k}_1 = \bar{k}_2$
$k_4 = -\bar{k}_3$
$\bar{k}_s = -\bar{k}_1$
$k_1 \neq k_3$

OPTICAL SIGNAL PROCESSOR FOR PROCESSING CONTINUOUS SIGNAL DATA

BACKGROUND OF THE INVENTION

This invention relates in general to optical signal processors, and in particular, to optical signal processors using long lasting storage to process data signals.

The following references are pertinent to the understanding of the background of the invention and are expressly incorporated herein by reference:

REFERENCES

1. L. Allen and J. H. Eberly, *Optical Resonance and Two-Level Atoms*, Wiley New York 1975, especially chapter 9.
2. T. W. Mossberg, "Time-domain frequency-selective optical data storage, Opt. Lett. 7, 77 (1982).
3. W. R. Babbitt, Y. S. Bai, and T. W. Mossberg, "Convolution, correlation, and storage of optical data in inhomogeneously broadened absorbers," Proceedings of the SPIE—The International Society for Optical Engineering, Vol 639, Advances in Optical Information Processing II (April 1986).
4. W. R Babbitt, "The Response of Inhomogeneously Broadened Optical Absorbers to Temporally Complex Light Pulses," Ph.D. Thesis, Harvard University, November 1987, University Microfilms, Ann Arbor, Mich.
5. T. W. Mossberg, "Time Domain Data Storage," U.S. Pat. No. 4,459,682 (Jul. 10, 1984).
6. Y. S. Bai, W. R. Babbitt, and T. W. Mossberg, "Coherent transient optical pulse-shape storage/recall using frequency-swept excitation pulses," Opt. Lett. 11, 724 (1986).
7. R. M. Macfarlane and R. M. Shelby, "Sub-kilohertz optical linewidths of the $^7F_0-^5D_0$ transition in $Y_2O_3Eu^{3+}$," Opt. Commun. 39, 169 (1981).
8. W. R. Babbitt and T. W. Mossberg, "Time-domain frequency-selective optical data storage in a solid-state material," Opt. Commun. 65, 185 (1988).
9. W. W. Moerner, "Molecular electronics for frequency domain optical storage: Persistent spectral hole-burning," J. Molec. Elec. 1, 55 (1985).
10. Frequency domain optical storage and other applications of persistent spectral hole-burning," Chapter 7 in *Persistent Spectral Hole-Burning: Science and Applications*, W. E. Moerner, Ed., Topics in Current Physics Vol. 44, Springer-Verlag, 1988.
11. Y. S. Bai, W. R. Babbitt, N. W. Carlson, and T. W. Mossberg, "Real-time optical waveform convolver/cross correlator," Appl. Phys, Lett. 45, 714 (1984).
12. T. W. Mossberg, Y. S. Bai, W. R. Babbitt, and N. W. Carlson, "Optical cross-correlation and convolution apparatus," U.S. Pat. No. 4,670,854 (Jun. 2, 1987).
13. K. P. Jackson and H. J. Shaw, "Fiber-optic delay-line signal Processors," Chapter 7.1 in *Optical Signal Processing*, E. Joseph L. Horner, Academic Press, San Diego (1987).
14. R. M. Macfarlane and R. M. Shelby, "Homogeneous line broadening of optical transitions of ions and molecules in glasses," J. Lum. 36, 179 (1987).
15. A. Winnacker, R. M. Shelby, and R. M. Macfarlane, "Photon-gated hole burning: a new mechanism using two-step photoionization," Opt. Lett. 10, 350 (1985).
16. A. Szabo, "Frequency Selective Optical Memory," U.S. Pat. No. 3,896,420.
17. G. Gastro et al. "Frequency Selective Optical Data Storage System," U.S. Pat. 4,101,976.
18. J. A. Bell and W. R. Babbitt, "Phase and frequency sensitive signal processing using stimulated photon echoes," Conference on Lasers and Electro-Optics, Anaheim, Calif., May 21-25, 1990, 1990 Technical Digest Series, Vol. 7, pp 420-421.

OPTICAL STORAGE—IN GENERAL

Recently coherent transient optical storage has become of increasing importance in the field of signal processing and high-density data storage. Materials which are used to obtain the advantages of coherent transient optical storage emit cooperatively enhanced radiation subsequent to being excited by optical radiation pulses. One may define cooperatively enhanced radiation as radiation emitted from a material into a coherent beam due to an ordering of the phases of the radiating oscillators throughout a medium. Preferred materials for use in coherent transient optical storage are inhomogeneously broadened optical absorbing materials (IBAM). Materials are inhomogeneously broadened if the individual atoms or molecules respond differently to external optical radiation at different wavelengths.

These IBAM are characterized by absorption profiles that are wider, often much wider, than the absorption profiles of the atoms of which they are composed. This situation comes about, as shown in FIG. 1, when the absorption profiles of individual atoms are shifted relative to one another throughout the sample. A dilute gas is a good example of an IBAM. In a gas, individual atoms have well-defined narrow (i.e., homogeneous) absorption frequencies which describe the range of frequencies over which it may respond. In gases, homogeneous linewidths are limited by spontaneous emission. For example, in Yb or Ba, a characteristic homogeneous linewidth for a dipole allowed transition in a low pressure gas is between 1-10 MHz. In atomic gases, inhomogeneous broadening results from the Doppler effect, each atom seeing a different laser frequency depending upon its velocity relative to the beam direction. The frequency spread of the different atoms is called the inhomogeneous width, and it may typically be on the order of 1 GHz. In solid state materials, inhomogeneous broadening arises from impurities or local strains within the lattice. Typical inhomogeneous linewidths are on the order of 10 GHz or higher. In room-temperature solids, linewidths can be quite broad because of phonon interactions exceeding the inhomogeneous linewidths, but at cryogenic temperatures, which freeze the lattice structure, the homogeneous linewidth can be orders of magnitude smaller, on the order of one kHz.

As shown in FIG. 1, an IBAM has an inhomogeneous absorption bandwidth, $\Delta f_i$, and is composed of absorbers having a smaller homogeneous absorption bandwidth, $\Delta f_h$. Absorbers may be understood to mean isolated atoms but may more generally be understood to mean atoms within a crystalline structure, molecules, or any structure capable of absorbing electromagnetic radiation and subsequently emitting radiation either spontaneously or by stimulated emission. If a low intensity monochromatic laser of frequency $f_o$ is made incident on a certain spatial region of the absorber, it will excite only those absorbers that lie within the excited spatial region and within a frequency bandwidth $\Delta f_h$ centered about $f_o$. The excited absorbers may occupy various excited energy states as shown in FIGS. 2a-2c. As a result, atoms within the IBAM can be addressed on the basis of both their spectral and spatial locations. The number of frequency channels independently addressable at a single spatial location is determined roughly by the ratio $\Delta f_I/\Delta f_h$.

Optical data storage techniques involving IBAM are focused into two major areas: frequency domain storage and time domain storage.

FREQUENCY DOMAIN

Frequency domain storage is used to store data directly into the inhomogeneous frequency distribution. Frequency domain optical storage uses persistent spectral hole burning to encode the data into the inhomogeneous profile. Spectral hole burning occurs when a narrowband, laser field interacts with an inhomogeneously broadened medium. The atoms interacting with the wave, after absorption of the radiation, may relax back to an alternative ground state or metastable state. As a result, the absorption at that frequency decreases and one says that a hole has been burned in the absorption profile. The presence or absence of a hole within a particular frequency band indicates a "1" or a "0" respectively. Persistent spectral hole burning (PHB) implies that a drop in the medium's absorption at this frequency continues even after the pump field has been turned off.

There are generally two types of persistent hole burning materials: one-photon type materials and photon-gated materials. In a one-photon material, only one photon is needed to be absorbed to create the persistent spectral hole. The major problem of one-photon persistent spectral hole burning is that the intensity for the reading laser must be kept sufficiently low to avoid burning holes and even if this is accomplished, significant hole burning still occurs after many successive reads, degrading the stored hole pattern.

In the photon-gated material, two separate lasers are used to burn the holes, but only one is needed to read them. Thus, in the photon-gated material, a persistent spectral hole may only be burned into the material in the presence of a second, or gating, field. In this case, burned holes are not degraded by the probing laser. (See Ref. 15 for a discussion of photon-hole burning and photon-gated materials.

For further details of frequency domain storage and appropriate IBAM, see, for example, Refs. 9, 10, and 15-17.

TIME DOMAIN

A time domain optical memory stores temporal sequences of pulses which may be recalled at a later time. Unlike the frequency domain approach, the information is packaged in time. A pulse within a specified time interval denotes a "1", while its absence is a "0". The time domain method uses the phenomenon of coherent light emission from the IBAM. (Coherent light emission from such a material which results from prior excitation of the material with coherent light pulses is generally referred to as a coherent transient.) A stimulated photon echo is the type of coherent light emission used in time domain storage techniques. The stimulated photon echo is used to record and play back the pulse train of data.

The temporal profile of the stimulated photon echo has been demonstrated to mimic the temporal profile of one of the light pulses used to generate it. The storage mechanism relies on individual absorbers in the media responding to only a narrow slice of the spectral distribution of the input light pulses. As illustrated in FIG. 3, the writing cycle for a stimulated photon echo involves illuminating an appropriate medium with a reference pulse and a data pulse, which are temporally separated. The medium stores information by recording the spectral interference of the reference and data pulses. Readout is accomplished by illuminating the medium with a read pulse identical to the reference pulse at an arbitrary time after the write cycle. This induces the medium to emit a delayed coherent transient output signal See, for example, Ref. 5 which discloses (as in FIG. 4 therein) details of apparatus which may be used for data storage and retrieval in an IBAM.

In order to better understand how the materials store the optical data it is necessary to understand what takes place within the material. Absorbers of interest here may have a variety of internal energy level schemes. FIG. 2a shows the simplest scheme which has a ground state and an excited state. The incident radiation causes atoms to move back and forth between these levels. In this simple case, all three laser pulses interact with the same transition, A, and information can be stored in frequency-dependent orderings of level populations or a similar ordering of the coherence between the two levels. The coherence between the two levels is important, because it corresponds to the absorber's optical electric- or magnetic-dipole moment. If this quantity is non-zero, the sample may emit coherent optical radiation. The properties of the light coherently emitted by the sample are determined by calculating the properties of the atomic coherence.

More complicated but perhaps more useful energy level schemes are shown in FIGS. 2b and 2c. The energy levels 2 and 3 are assumed to be very closely spaced relative to their separation from level 1. In these systems, the transitions A and B may be distinguished by the laser frequency or polarization, and each laser pulse interacts with only a particular one of the transitions. The ability to distinguish light resonant with a particular transition is useful in detecting the material signal in the background of the laser pulses. In these three-level systems, information may be stored in spectrally ordered coherence involving any pair of the three levels, or in spectral orderings of population of any one level. For a more complete discussion of optical coherence in IBAM, see Refs 2-6.

If the reference and read pulses are temporally brief (with respect to the temporal features of the data pulse), the output signal generated by the medium will mimic the temporal waveform on the data pulse. The duration of the data pulse (the time between the beginning and end of the data pulse) is limited by the homogeneous decay time of the absorbers in the medium which can be as long as a millisecond in some cases. The data bandwidth is limited by the medium's inhomogeneous bandwidth which can be as large as a few hundred gigahertz.

To maximize the output signal, the thickness of the material should be set such that the transmittance is approximately $e^{-1}$. The output signal strength also depends on the amplitude of the spectral grating produced during the writing cycle (i.e. the extent to which absorbers are transferred from their ground to excited states). However, low fidelity output echoes result if the absorption is saturated by the input pulses being too intense Under appropriate conditions when the input pulses are not too intense, the output signal intensity is reduced to an acceptable level on the order of 20 dB from the input data pulse power level. See Refs. 8 and 11.

GATING

The properties of the inhomogeneously broadened absorbing medium are the limiting factors in the maximum bandwidth, pulse duration and storage time for a stimulated photon echo. One of the drawbacks of this form of optical storage has been the relative short storage time of the data. Various gating techniques have been described in relation to frequency domain systems which serve to lengthen the storage time of the data. See for example, Refs. 9, 10 and 15.

The relaxation of the spectral gratings which store information for stimulated photon echoes limits the storage time. Ref. 8. Such gratings have been shown to persist for more than a minute in some solid materials and experimental results suggest that storage times of several days or longer are possible.

In order for the reading process to be non-destructive a gating process is required after the write cycle. This gating process alters the material such that the spectral grating in the absorbers' ground state population distribution is permanently fixed or fixed until a reversing operation is performed. The absorbers in the medium return to this ground state (provided it is unique) after excitation by read pulses, and thus, the read cycle does not modify the stored information.

CONVOLUTIONS AND CROSS-CORRELATIONS

Another explored use of inhomogeneously broadened optical storage medium involves a coherent transient phenomenon which is related to stimulated photon echoes and leads to an emission which is a convolution or cross-correlation between temporally brief electromagnetic pulses. Mossberg et al. in Ref. 12 and Babbitt et al. in Refs. 3 and 4, describe devices which use inhomogeneously broadened absorbing material to perform cross-correlation and convolution operations. In the case of three input pulses, if only one pulse is temporally brief and the other two are temporally modulated, then the temporal waveform of the coherent transient output signal will be the convolution or cross-correlation of the waveforms of the two modulated pulses. The operation of convolution is performed when the first pulse in the three pulse sequence is temporally brief. The operation of cross-correlation is performed when either the second or third pulse is temporally brief. Other operations can be performed simultaneously if all three pulses are temporally modulated. The duration of the modulated pulses and their bandwidths are limited by the homogeneous decay rate and the inhomogeneous linewidth, respectively, just as with stimulated echoes.

In the prior art, as for example in Ref. 12, applications involving convolutions and cross-correlations with coherent transients have used materials that respond to the three input pulses, in order to generate an output signal. The third pulse, however, destroys the pattern stored by the first two pulses. As a result, if an application involves searching an uninterrupted data stream for a given pattern or encoding/decoding a data stream, the data stream must be broken up into overlapping segments whose duration is governed by the homogenous decay time. Each data segment must then be input one at a time into the processor along with the search pattern pulse and the temporally brief reference pulse.

SUMMARY OF THE INVENTION

It is an object of the invention to provide an electromagnetic signal processor which overcomes the above mentioned deficiencies. In accordance with the invention, the processor is able to process data in a continuous fashion for a variety of applications.

It is another objective of the invention to provide a processor which has greater storage capability, and is able to perform read and write operations at speeds faster than presently capable.

One important advantage of the processor herein disclosed over earlier convolution/cross-correlation techniques is that once the first two input pulses are stored in the medium, they need not be reentered. Consequently, the continuous data stream does not need to be broken up into overlapping section. This greatly increases the obtainable processing speed, allowing real-time processing of continuous data streams with multi-gigahertz bandwidths.

Similar to the exiting technique for signal processing with coherent transients just described, in the signal processor of the invention, two modulated pulses illuminate a material which emits cooperatively enhanced radiation such as an inhomogeneously broadened absorbing medium. The duration of this two pulse sequence is again limited by the homogeneous decay time of the absorber in the medium.

Unlike prior optical signal processing methods, the medium is induced to store the spectral interference of the two input pulses for a time much longer than the homogeneous decay time. This is accomplished by gating the medium by some means which prevents the absorbers excited during the writing cycle to decay back to their original ground states.

In an alternate embodiment of the invention, an IBAM is used in a continuous signal processor wherein the IBAM exhibits a property whereby the stored data has a relatively long storage time, and the reading process does not significantly erase the stored data. Here, the ground state population distribution permanently stores the spectral grating produced by the input pulses (or at least until the medium is erased by a process that restores the absorbers back to their initial ground state distribution). Absorbers excited after the gating process by subsequent optical pulses will relax back to the ground state population distribution thus restoring the spectral grating.

After the medium has stored the spectral interference via one of the above mentioned processes, it can be non-destructively probed by a continuous (uninterrupted) temporally modulated optical data stream. The resultant output signal from the medium may have, for example, a temporal waveform which is the convolution or cross-correlation of the waveform of the first modulated pulse and the continuous data stream.

In accordance with the principles of the invention, there is provided apparatus for performing the operations of cross-correlation or convolution on one or more segments of information. The apparatus comprises:

a) at least one source of electromagnetic radiation,
  b) a modulation device for modulating the electromagnetic radiation to produce first and second input pulses of electromagnetic radiation, one of which is a first information input pulse composed of a series of information signals, and the other of which is a reference pulse, the information input pulse being time varying in accordance with the one or more segments of information, and the reference pulse being temporally brief in relation to the duration of the shortest information signals which make up the first information input pulse, c) a sample of absorbers which emits cooperatively enhanced radiation subsequent to excitation by pulses of electromagnetic radiation, d) electromagnetic directing devices for directing the modulated radiation for exposing the sample in sequence to the first and then to the second input pulses so as to produce a spectral interference pattern resulting in a non-thermal frequency distribution of ground state absorbers within said sample, e) a gating device operative on the sample which causes said spectral interference pattern to be one of (1) permanently stored in said sample and (2) reversibly stored in said sample, thereby producing a gated sample, f) a modulating device for modulating the electromagnetic radiation to produce a third input pulse of electromagnetic radiation, the third pulse being a second information input pulse, the second information input pulse being time varying in accordance with the one or more segments of information, and having a time duration greater than zero and not greater than the time duration for erasure of the non-thermal frequency distribution of the ground state absorbers of said sample, g) an electromagnetic device for exposing the gated sample to the third input pulse to stimulate the cooperatively enhanced electromagnetic radiation, and h) a detector for detecting the cooperatively enhanced electromagnetic radiation as a representation of the result of the cross-correlation or convolution operations.

In accordance with another aspect of the invention, there is provided an apparatus for encoding and decoding information by performing the operations of cross-correlation or convolution on one or more segments of information. The apparatus comprises:

1) an encoder including:
   a) at least one source of electromagnetic radiation,
   b) a device for modulating the electromagnetic radiation to produce first and second input pulses of electromagnetic radiation, one of which is a first information input pulse composed of a series of information signals, and the other of which is a reference pulse, the first information input pulse being time varying in accordance with the one or more segments of information, and the reference pulse being temporally brief in relation to the duration of the shortest information signals which make up the first information input pulse,
   c) a sample of absorbers which emits cooperatively enhanced radiation subsequent to excitation by pulses of electromagnetic radiation,
   d) a device for exposing the sample in sequence to the first and then to the second input pulses so as to produce a spectral interference pattern resulting in a non-thermal frequency distribution of ground state absorbers within the sample,
   e) a gating device operative on the sample which causes the spectral interference pattern to be one of (1) permanently stored in the sample and (2) reversibly stored in the sample, thereby producing a gated sample,
   f) a device for modulating the electromagnetic radiation to produce a third input pulse of electromagnetic radiation, the third input pulse being a second information input pulse, the second information input pulse being time varying in accordance with the one or more segments of information, and having a time duration greater than zero and not greater than the time duration for erasure of the non-thermal frequency distribution of the ground state absorbers of the sample,
   g) a device for exposing the gated sample to the third input pulse to stimulate the cooperatively enhanced electromagnetic radiation, to thereby encode the second information input pulse to produce encoded information, and 2) a decoder including:
   a) at least one source of electromagnetic radiation,
   b) a device for modulating the electromagnetic radiation to produce additional first and additional second input pulses of electromagnetic radiation identical respectively to the first and second input pulses,
   c) an additional sample of absorbers which emits cooperatively enhance radiation subsequent to excitation by pulses of electromagnetic radiation,
   d) a device for exposing the additional sample in sequence to the second additional input pulse and then to the first additional input pulse so as to produce a spectral interference pattern resulting in a non-thermal frequency distribution of ground state absorbers within the additional sample,
   e) a gating device operative on the additional sample which causes the spectral interference pattern to be one of (1) permanently stored in the sample and (2) reversibly stored in the sample, thereby producing an additional gated sample,
   f) a device for exposing the additional gated sample to the cooperatively enhanced electromagnetic radiation from the encoder to stimulate additional cooperatively enhanced electromagnetic radiation from the additional gated sample, to thereby decode the cooperatively enhanced electromagnetic radiation from the encoder, and
   g) a detector for detecting the additional cooperatively enhanced electromagnetic radiation from the decoder as a representation of the first information input pulse.

BRIEF DESCRIPTION OF THE DRAWINGS

FIGS. 15a and 15b illustrate wave vector diagrams for write and read operations of another embodiment of the invention which also utilizes chirped pulses.

FIGS. 16a and 16b illustrate wave vector diagrams for write and read operations of another embodiment of the invention also using chirped pulses.

FIGS. 17a and 17b illustrate wave vector diagrams for write and read operations according to another embodiment of the invention which also uses chirped pulses.

DETAILED DESCRIPTION OF THE PREFERRED EMBODIMENTS

In general, the sample of material used in the invention is said to be composed of absorbers which emit cooperatively enhanced radiation subsequent to excitation by pulses of electromagnetic (for example, optical) radiation. One class of such materials is characterized as inhomogeneously broadened absorbing materials. The invention, however, is not limited to such materials but may also include, for example, structurally broadened materials in which the frequency response of each slice of the material is as sharp as a homogeneous linewidth $\Delta f_a$, but each slice has a distinct central frequency $f_o$. Thus the frequency response of the medium (rather than being isotropic) is a function of distance along the excitation axis. The frequency spacing between slices is on the order of the homogeneous width. The range of central frequencies $\Delta f_1$ is roughly the number of slices multiplied by the homogeneous width.

FIRST PREFERRED EMBODIMENT

Structure

Figure 1:
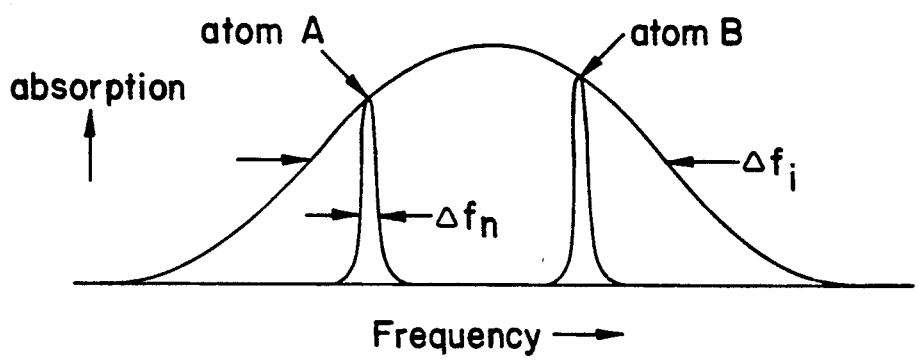
FIG. 1 illustrates the inhomogeneous and homogeneous line widths of an inhomogeneously broadened absorbing material as known in the prior art.
Figure 2A:
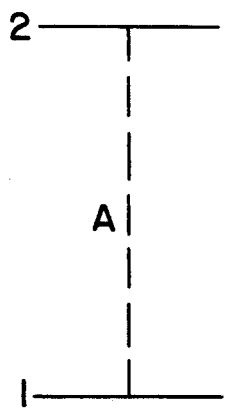
FIGS. 2A–2C illustrate the various energy levels of excited states of atoms in an inhomogeneously broadened absorbing medium.
Figure 2B:
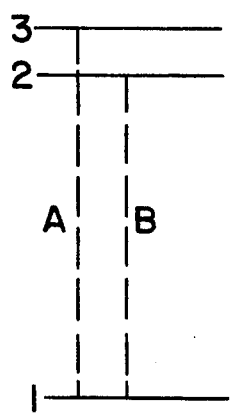
Figure 2C:
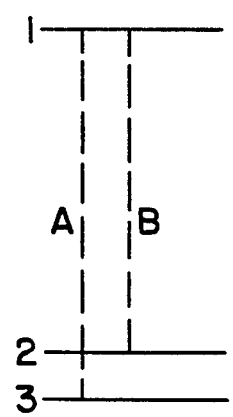
Figure 3:
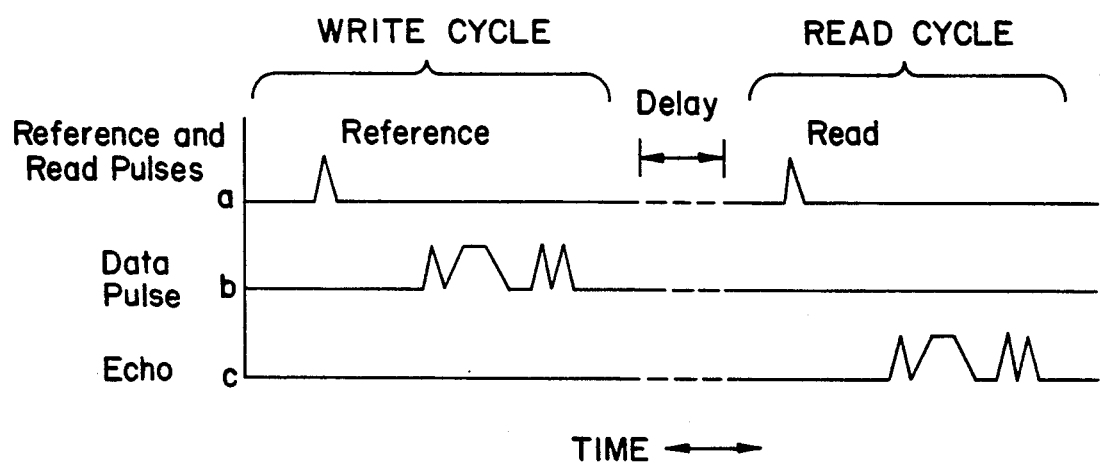
FIG. 3 represents a timing diagram of the sequence of pulses used to produce a stimulated photon echo.
Figure 4:
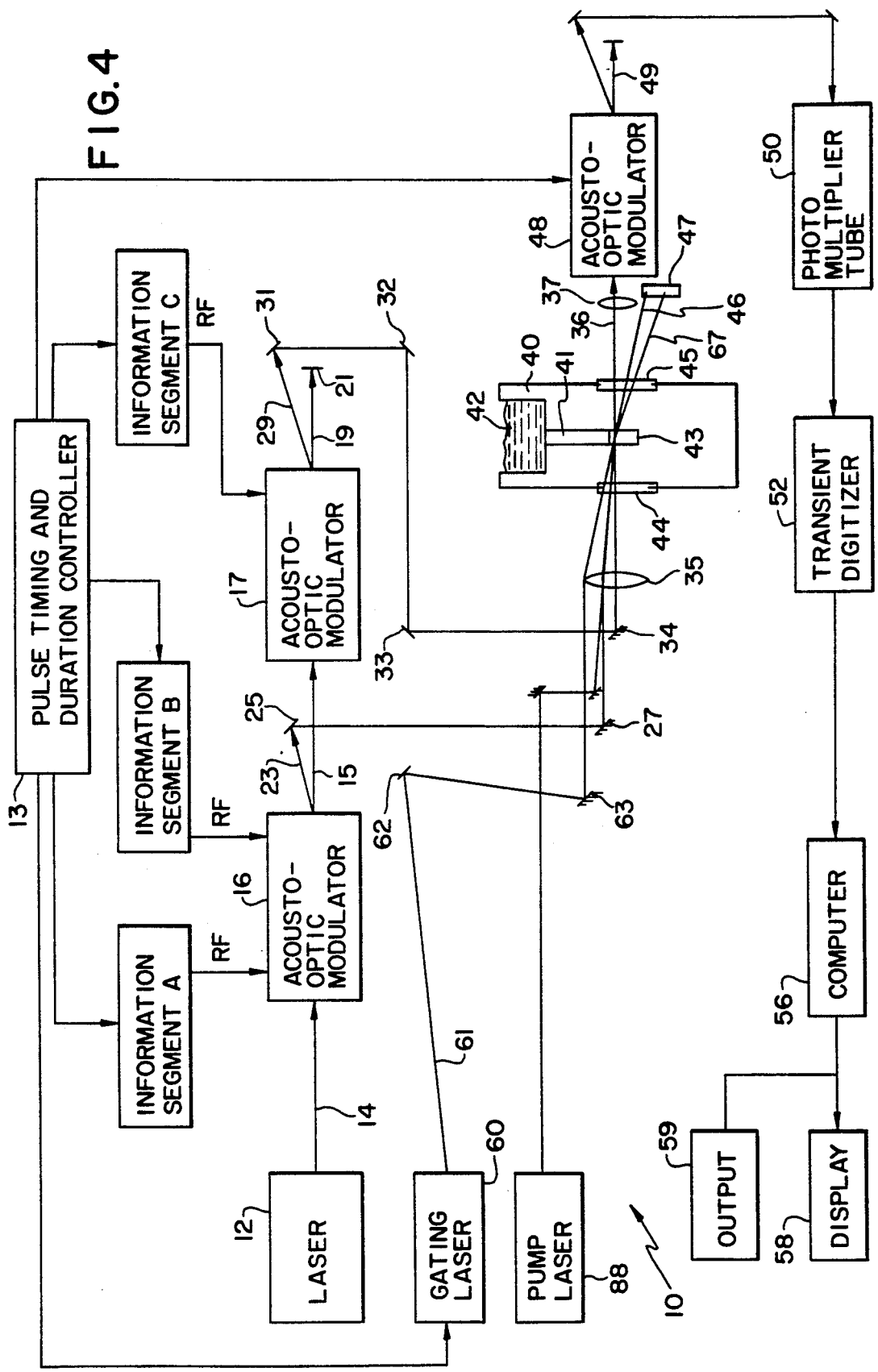
FIG. 4 is a block diagram of a cross-correlation or convolution apparatus in accordance with a first embodiment of the invention.

Referring to FIG. 4, optical cross correlation and convolution system 10 employs two lasers 12 and 60. Laser 12 is a continuous wave, single frequency laser tuned to an inhomogeneously broadened absorption line of a sample 43. The output beam 14 of this laser 12 is directed through a pair of acousto-optic modulators 16,17. The other laser 60, the gating laser, is a broadband pulsed laser tuned to an absorption line of the sample 43 that connects the excited state of the absorption line to which laser 12 is tuned to a state other than the ground state to which laser 12 is tuned. This other state of the absorber preferably forms a permanent reservoir and does not transition to the ground state when subsequently exposed to radiation from laser 12. The output or gating beam 61 of laser 60 is reflected by mirrors 62 and 63 and is directed through lens 35 and is focussed into the sample 43 at an angle with respect to the output beams of modulators 16, 17. The gating beam overlaps the output beams of modulators 16, 17 in the sample 43.

Modulators 16, 17 modulate beam 14 to form three successive time-limited input pulses that eventually cross each other's path at an angle of, for example, 0.1 radians and overlap in the sample 43. Two of the pulses are amplitude modulated in modulator 16 in accordance with two time varying segments A and B of information to be cross-correlated or convolved. The third pulse is amplitude modulated in modulator 17 in accordance with a third time varying segment of information C. The amplitude modulation of each pulse is accomplished by applying to the modulator 16, 17 an RF signal which is itself amplitude modulated in accordance with the corresponding information segment. Modulators 16, 17 also control the time durations of the three pulses and the time delays between the pulses as directed by a pulse timing and duration controller 13. Each modulator accomplishes this by angularly diverting the beam to begin the pulse and permitting the beam to return to its original position to end the pulse. When the output beam of modulator 16 is in its original position, it passes through modulator 17. When the output beam of modulator 17 is in its original position 19 (i.e., when no pulses are being transmitted to the sample) it is terminated by a beam stop 21. When the output beam of modulator 16 is being diverted at path 23, it is reflected by mirrors 25 and 27 and is directed through lens 35 and is focussed onto the sample 43. The output beam 29 of modulator 17 is reflected by mirrors 31, 32 and 33 and by a knife edge mirror 34 and is then directed through lens 35 and focussed into the sample 43 at an angle with respect to the output beam of modulator 16.

Cryostat 40 is an evacuated structure with a copper cold finger 41 that thermally connects the sample 43 to a liquid helium reservoir 42. The sample 43 is maintained at a temperature of roughly 4° Kelvin. Windows 44 and 45 provide optical access to the sample 43. The illuminated volume in the sample is on the order of a few microns in radius and a millimeter in length.

At some time following the delivery of the sequence of three input pulses and output pulse of cooperatively enhanced optical radiation is emitted from sample 43 on a beam 36, which also carries the pulse generated by modulator 17. The beam 46 from modulator 16 and the beam 67 from the gating laser 60 pass through the sample and are blocked by a beam stop 47. Beam 36 propagates through lens 37 (which recollimates the beam) and through an acousto-optic modulator 48 which passes its input pulse through on a discarded beam 49 and diverts the output pulse to a fast photomultiplier tube 50. The purpose of the acoustic-optical modulator 48 is to shield the photomultiplier tube 50 from seeing the full intensity of the output of modulator 17. Modulator 48 is switched to its diverting mode just before the start of the reading pulse. Modulator 48 may be replaced by a movable beam block. Tube 50 delivers a time dependent signal segment (whose amplitude tracks the varying amplitude of the output pulse) to a transient digitizer 52 (for example model HP 54111D manufactured by Hewlett-Packard) which is capable of capturing the data in real time. The data may be averaged over several events to improve the signal to noise ratio. The resulting digital samples are stored in a computer 56. The digital samples, which represent a time segment of information corresponding to the convolution, or cross-correlation, or some combination thereof, of the three original segments A, B, and C, can then be displayed on a display device 58 or other output device 59 such as a printer or computer storage disc.

Taking relaxation into account, the output pulse ranges from 0.01% to 5% as intense as the input pulses. The total duration of a single iteration from the first input pulse to the output pulse is typically limited by the upper state lifetime of the sample in a two level system and by the thermalization of the ground state in a system with multiple ground state levels and/or gated systems.

OPERATION

The output pulse can be made to represent either a cross-correlation or convolution of two of the three segments A, B, and C, by appropriate control of the configurations of the three input pulses.

Figure 5:
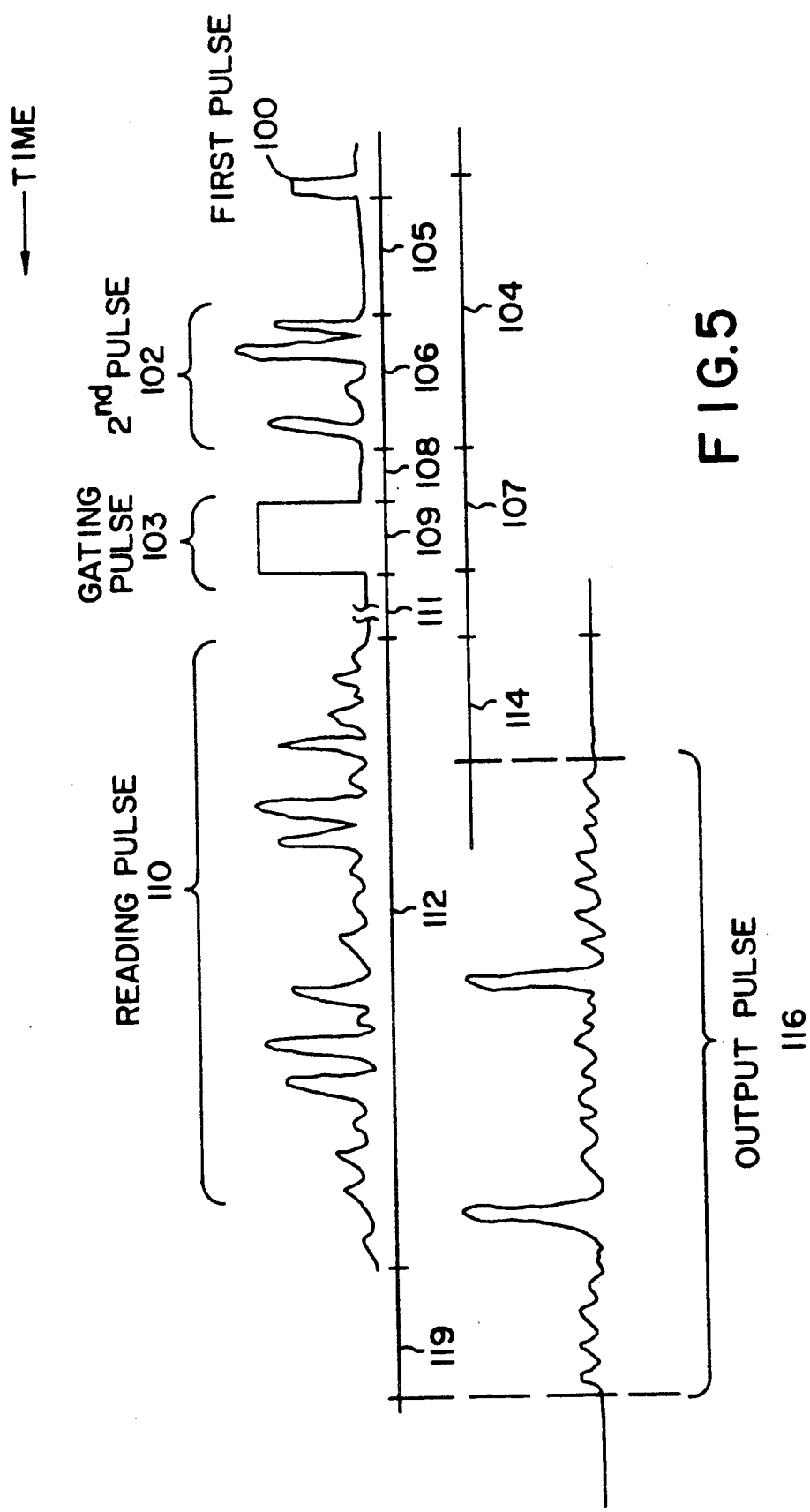
FIG. 5 is a timing diagram used in explaining the operation of the apparatus of FIG. 4.

Referring to FIG. 5 (in which time passes from right to left), to obtain a convolution, for example, the first input pulse 100 (generated by modulator 16) is a brief control pulse shorter in time than the briefest temporal feature of interest in the information pulses. (In the general case, modulator 16 may modulate the incoming laser beam with two information pulses, segment A and segment B. In the present example, information segment A for modulator 16 is replaced by a control pulse.) Pulse 100 excites one of the inhomogeneously broadened absorption lines in the sample 43. The shape of pulse 100 is immaterial. The second input pulse 102 (generated by modulator 17) carries one of the information segments, namely segment C, and excites the same absorption line. The second input pulse 102 is the first information pulse in the present example. The time 104 between the beginning of the first pulse and the end of the second pulse shouldn't be significantly longer than about T2, the homogeneous relaxation time of the absorption line. The delay 105 between the end of the first pulse 100 and the beginning of the second pulse 102 establishes the delay 114 between the start of the third pulse 110 and the start of the output pulse 116.

Following the second pulse 102, and after a delay 108, a gating pulse 103 is delivered to the sample. The delay 107 between the end of the second pulse 102 and the end of the gating pulse 103 should be less than or on the order of the lifetime of the excited state of the absorption line excited by the first and second pulses 100, 102. The duration 109 of the gating pulse 103 should be sufficiently long in order that a large portion of the excited state absorbers undergo photochemical reaction. Ideally one would want 100% of the excited state absorbers to undergo photochemical reaction, but in practice the reaction takes place for a few percent of the excited state absorbers. The gating pulse causes a transition to a fixed or reservoir state which is stable against decay to the ground state in the absence of the gating pulse. This fixed state thus fixes or preserves the frequency distribution pattern of the ground state caused by the spectral interference of the first and second pulses. (In the presence of another optical pulse, an erasing pulse, the fixed or reservoir state could be stimulated to transition to the ground state, thus erasing the stored ground state frequency distribution pattern.)

Following the gating pulse 103, and after a delay 111, the reading pulse 110 (which carries the second information segment, segment B) is delivered from the modulator 16. This reading pulse 110 excites the same absorption line as pulses 100 and 102. Delay 111 could be any length longer than zero provided that at the time the reading pulse 110 is delivered, the frequency distribution of the ground state population has not thermalized or been erased. Moreover, since the gating pulse 103 has been used to fix or store the non-thermal frequency distribution of the ground state absorbers, the reading pulse 110 may have a time duration 112 which is not limited to the homogeneous dephasing (relaxation) time of the absorption line. It is only limited by the time it takes for the frequency distribution of the ground state created by pulses 100 and 102 to be erased. The average intensity of the reading pulse 110 must be reduced to a level that assures that the absorption line does not become saturated.

After a delay 114 (which is equal to delay 105) after the start of the reading pulse 110, the output pulse 116 appears. The output pulse 116 continues to appear during the reading pulse and for a time 119 after the end of the reading pulse. Time 119 is equal to time 114. The amplitude variation of pulse 116 is representative of the convolution of pulses 102 and 110.

The three input pulses produce the desired output pulse in the following manner.

The brief first pulse transfers a portion (e.g., about 50%) but not all of the population from the ground state of the absorption line to its excited state. The amplitude of the excited state reflects the Fourier transform of the first control pulse 100 (assuming that its intensity is sufficiently low that the material's response to it can be described as approximately linear). Before homogeneous relaxation of the absorption line destroys the coherence between the ground and excited states amplitudes, the second pulse 102 is applied. Pulse 102 has a time varying waveform whose Fourier transform frequency spectrum falls within the inhomogeneously broadened bandwidth of the absorption line. The intensity of the temporal second pulse 102 is adjusted so that for any particular frequency channel within the inhomogeneous bandwidth, the fraction of population initially in one terminal level of the transition which is transferred to the other by the pulse is less than about one half. The population amplitudes transferred by the second pulse 102 reflect its Fourier transform. As a result, the population transferred from the ground to excited state corresponds to the product of the Fourier transforms of the first two pulses. Because the first pulse is relatively brief, its Fourier transform may be considered a constant so that, after the second pulse, the frequency distribution of the ground state and excited state populations are in effect a stored version of the frequency spectrum of the second pulse. That distribution decays slowly as the excited state relaxes, and while it continues to exist, the gating pulse is applied. The gating pulse has the effect of causing a photochemical reaction in those absorbers that are in the excited state when the gating pulse arrives. This prevents these absorbers from decaying back down to their original ground state which would effectively erase the information stored in the frequency dependent ground state population distribution created by the first and second pulses 100, 102. If the gating efficiency is low (only a small portion of the excited state absorbers undergo photochemical reactions), the frequency distribution can be accumulated by repeated sequential application of the first, second, and gating pulses. Once the sample is gated, provided that the reading pulse 110 does not permanently optically pump the absorbers or cause a photochemical reaction that depletes the ground state or that the photochemical change does not relax back to its original state, the frequency distribution stored in the ground state populations will persist.

The effect of optical pumping would result if the sample has multiple ground states. Additional lasers could be introduced to reverse any optical pumping by the reading pulse. The effect of saturation would occur if the average intensity of the reading pulse 110 was such that absorbers were being excited at a rate that is greater than the rate at which the absorbers relax to the ground state. This would cause distortions of the output pulse 116 due to selective erasure of the frequency dependent ground state population distribution. Saturation is not permanent and can be reversed if the reading pulse 110 intensity is significantly reduced for more than the relaxation time of the absorption line.

After the frequency distribution of the ground state has been stored via the gating process, the reading pulse is applied. The reading pulse establishes an optical electric dipole polarization whose frequency distribution depends on the frequency distributions in the population of the ground and excited states multiplied by the Fourier transforms of the reading pulse. Thereafter as time passes the respective frequencies of the electric dipoles evolve through different stages of coherence, and the resulting cooperatively enhanced optical radiation produces the output pulse 116 with a waveform whose temporal intensity represents the square of the convolution of the electric-field amplitude waveforms of the second pulse 102 and the reading pulses 110. Even though the reading pulse and output pulse are temporally overlapped, they are spatially separated due to the angling of the input beams.

Cross correlation, on the other hand, is accomplished, for example, by making the second pulse the brief one and encoding the information segments in the first pulse and the third, (reading) pulses. In a manner similar to that described above, this input pulse sequence leads to the creation of an optical electric-dipole polarization. In this case, however, its frequency distribution depends on the Fourier transform of pulse one multiplied by the complex conjugate of the Fourier transform of pulse three. The output pulse then evolves as the cross-correlation of pulses one and three.

Generally it can be shown that for three laser pulses that are resonant with inhomogeneously broadened transitions as described above and have electric fields of the form $$E_p(\vec{r},t) = \epsilon_p(t-\eta_p) \cos[(\omega_0(t-\eta_p)]$$

where P=1, 2, 3 identifies the pulse, $\epsilon_p(t)$ is a slowly time varying envelope function, $$\eta_p = (\vec{k}\cdot\vec{r}/c) + t_p$$

where $k_p$ is the unit wave vector of pulse P, and $t_p$ is the time that pulse p passes an arbitrary location r=0. The output pulse has an electric field term $E_c(t)$ which is proportional to $$\int_{-\infty}^{\infty} E_1(\omega)E_2^*(\omega)E_3^*(\omega) \, e^{-i\omega t} d\omega$$

where $E_p(\omega)$ is the fourier transform of $E_p(r,t)$. The term $E_c(t)$ can be isolated from other coherent signals emitted by the material by controlling the polarization or the timing or direction of propagation (as explained above) of the input pulses.

If the first input pulse is short (and therefore its Fourier transform may be considered a constant), the $E_c(t)$ is proportional to $$\left[\int_{-\infty}^{\infty} \epsilon_2(u)\epsilon_3[(t-\eta_c)-u]du\right]\cos[\omega_0(t-\eta_c)] \quad (1)$$

which is a convolution of $\epsilon_2$ and $\epsilon_3$. If the second pulse is short, $E_c(t)$ is proportional to $$\left[\int_{-\infty}^{-} \epsilon_1[u-(t-\eta_c)]\epsilon_3(u)du\right]\cos[\omega_0(t=\eta_c)]$$

which is a cross-correlation of $\epsilon_1$ and $\epsilon_3$. Here $\eta_c = \eta_2 + \eta_3 - \eta_1$. When all three pulses have temporal structure, $E_c(t)$ represents the cross-correlation of pulse one with the convolution of pulses two and three. See, Refs. 11 and 18. As explained in these articles, to generate output pulses of optimum intensity, one must employ pulse areas on the order of $\pi$ radians. Unfortunately, the Fourier approximation which leads to Eqs. (1) and (2) becomes of questionable validity in this rather large excitation pulse area regime, and it is expected that the predications of Equations (1) and (2) would become only approximate.

Other modifications of the first embodiment are within the scope of the invention.

A diode laser could replace the tunable dye laser. A diode laser can be modulated directly without the need for an acousto-optic modulator. Material transitions corresponding to different resonant frequencies can be excited by using more than one diode laser, each operating independently at one of the needed frequencies.

An example of an inhomogeneously broadened material is a solid such as a Europium doped crystal matrix (doped with Yttrium Oxide), in which case the inhomogeneously broadened bandwidth would be several GHz. See, for example, chapter 5 of Ref.4, incorporated herein by reference. A gatable IBAM would be, for example, BaClF:$Sm^{2+}$. Details of an experimental setup used to study coherent transitions involving convolutions and cross correlations in the Europium doped crystal are also set forth in chapter 5 of the above reference. Other IBAM are described in Refs. 5, 9 and 10 incorporated herein by reference.

The intensity of the third or reading pulse 110 (which may be essentially continuous) can vary but must be small enough to transfer no more than a fraction (significantly less than 50%) of the population at any given frequency in one terminal level of the excited transition to the other terminal level. Since the duration of the reading pulse may be, and generally is considerably longer than the homogeneous relaxation time of the transitions resulting from the spectral interference pattern established by the first and second pulses, the amplitude of the reading pulse should not be so strong as to saturate the absorbers taking into consideration the data bit rate, length of time of the reading pulse etc.

The bandwidth of the laser can be broadened to produce essentially incoherent light permitting the intensity of the first, second and reading pulses to be increased, thus enhancing the output pulse intensity without saturating the emitting material. By broadening the bandwidth of the laser, the peaks in the Fourier power spectrum of the pulses are also broadened and reduced in magnitude, thus reducing any saturation effects. Provided that the laser bandwidth is much broader than the data bandwidth, the contribution to the convolution/correlation peaks will add incoherently (rather than coherently). In this case, the intensity waveform level of the output pulse corresponds directly to the cross-correlation or convolution or successive application of convolutions and/or correlations of the input information pulses, rather than to its square.

The time dependent information can be encoded in the two information pulses by techniques other than amplitude modulation, for example phase or frequency modulation.

The output pulse could be detected by homodyne detection in which it would be mixed with a phase coherent laser field of the same frequency. In that technique, the electric field (rather than the intensity which is the square of the electric field) is measured as a function of time.

The input pulses could be appropriately polarized and the detector could be preceded by a polarization selective filter that would be selective to the output pulse's polarization.

In applications where a single short reference pulse (first pulse 100) is undesirable, a pair of linearly frequency chirped pulses may be substituted. A linearly frequency chirped pulse is one in which the frequency of the pulse ramps linearly from its value at the start of the pulse to a different value at the end of the pulse. The chirp bandwidth is the difference between the start and stop frequency, and the chirp rate is the chirp bandwidth divided by the pulse duration. The pulses should be chirped over the same bandwidth that the reference pulse otherwise would uniformly excite, and the second chirped pulse should have a chirp rate twice that of the first. The chirped pulses occur in the temporal input sequence at the time otherwise occupied by the reference pulse. Their total duration may be up to those of normal information pulses. The end of the second chirped pulse should precede any subsequent information pulse by at least its own duration. Using long chirped pulses lowers the laser intensity require to transfer about one half of the atomic state populations from one level to another which is roughly appropriate for the control pulse.

The use of coupled transitions having inhomogeneous broadening which are correlated but of different bandwidths can be employed to change the time scale associated with the output signal or input pulses.

Input pulse sequences containing various numbers of pulses can be employed. The output signal will represent a sequence of cross-correlation and/or convolution operations performed on the input pulses.

More than 3 binary temporally encoded information pulses can be employed. The output signal will represent the product value of all the input values in a mixed binary form. In the case of multiplication, the temporal encoding need not be binary. The inputs can be in mixed binary and have positive or negative (180° out of phase) values. The input information values can be encoded in any base system, i.e., mixed trinary, mixed decimal, etc.

SECOND PREFERRED EMBODIMENT

Figure 6:
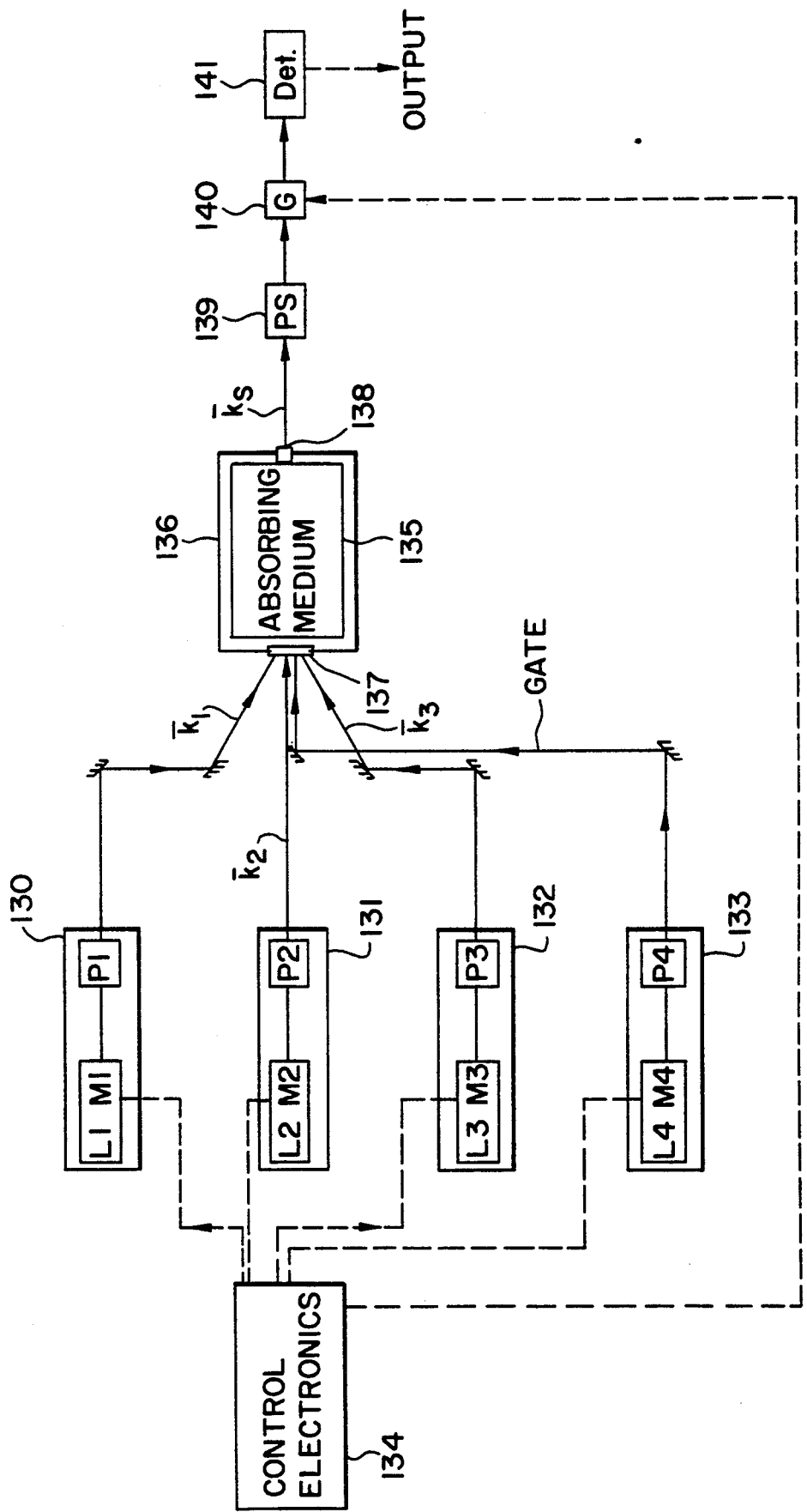
FIG. 6 is a block diagram of a cross-correlation or convolution apparatus in accordance with a second embodiment of the invention.
Figure 7:
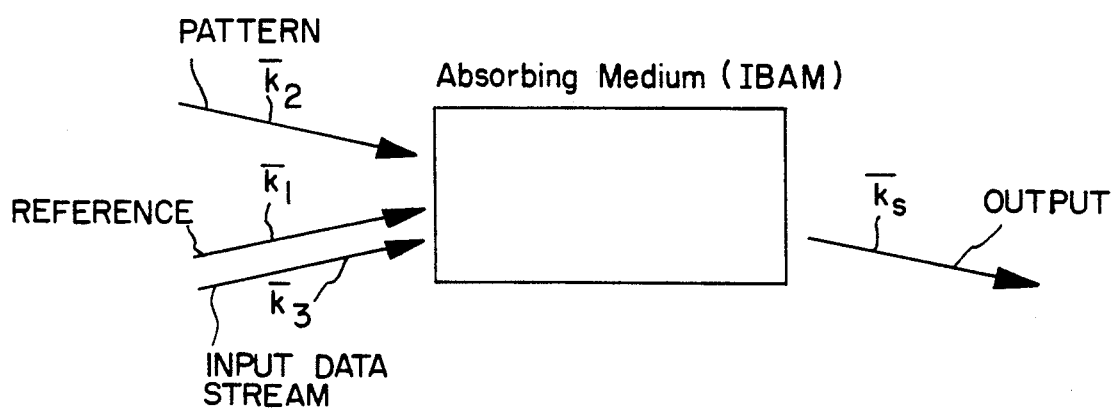
FIG. 7 is a diagram representing the wave vectors of the incident and output beams of FIG. 6.

A second embodiment of the invention is illustrated in FIG. 6. Four laser sources L1, L2, L3 and L4 connected to an electronic control device, are modulated by modulators M1, M2, M3 and M4, and polarized by polarizer P1, P2, P3 and P4 respectively. Combined these four elements make up electromagnetic radiation sources 130, 131, 132, and 133, respectively. The laser pulses are controlled by the control electronics 134. Laser sources 130-132 are used to generate the first, second, and third (reading) pulses respectively, whereas radiation source 133 is used for gating. The laser beams are made incident upon absorbing medium, as shown in FIG. 7, in such a manner that the vector phase matching condition $$|\vec{k}_s| = \omega_s/c$$

is satisfied where, $$\vec{k}_s = \vec{k}_3 \pm (\vec{k}_2 - \vec{k}_1)$$

$\omega_s$ is the frequency of the cooperatively enhanced radiation, and c is the speed of light. $k_s$, $k_1$, $k_2$ and $k_4$ are the wave vectors of the output signal, the 4 reference pulse, the pattern pulse, and the input data stream, respectively. The vector phase matching condition is also used in the first embodiment of the invention, FIGS. 4 and 5.

In this second embodiment of the invention, the absorbing medium 135 is, for example, $BaClF:Sm^{2+}$. This material is chosen because it may be electromagnetically gated. The inputs are angularly separated as they enter the medium so that the output signal can be spatially distinguished from the optical data stream during readout. In a solid state IBAM, only the plus sign is possible in the phase matching condition set forth above, so the output signal direction is given by the phase matching condition $k_s = k_3 + k_2 - k_1$, (See Ref. 5 for a further explanation of the phase matching conditions).

Since $BaClF:Sm^{2+}$ only exhibits the desired homogenous and inhomogeneous bandwidths at low temperatures the absorbing material is placed in a liquid helium cryostat 136. The input pulses enter the cryostat through window 137 and the output exits through window 138.

Extraneous signals traveling in the direction of $k_s$ are eliminated by the combined action of a polarization filter 139 and an acousto- or electro-optic gate 140. In a modification of this embodiment, a single laser source may be used to generate all three input beams. Finally a detector 141 detects the output from the absorbing material and processes the data. Such a detector may be any of the optical or electrical detecting devices known in the art, such as FND100 by EG&G Photon Devices or Antel model AR-S2. The laser sources may be cw dye lasers or more preferably semi-conductor diode lasers.

The operation of the second embodiment of the invention is similar to that of the first embodiment. A first input pulse of electromagnetic radiation is directed toward the IBAM 135. This first pulse, $k_1$, has a bandwidth comparable to the inhomogeneous bandwidth of the absorbing materials. Again it may be assumed that the first pulse is temporally brief and, therefore, a convolution is to be performed. A second input pulse, $k_2$, which contains the data is then made incident upon the material. This pulse is temporally modulated according to the data to be stored. The delay between the first and second pulse and the duration of the second pulse must be shorter than the homogeneous decay rate of the absorbing medium. The frequency of this pulse and its bandwidth is limited by the inhomogeneous bandwidth of the absorbing medium.

The spectral interference pattern created by these two input pulses is stored in the absorbing medium via a gating technique. In this case the three lowest excited states of the transition, $^5D_0$, $^5D_1$, $^5D_2$ are meta-stable states with a lifetime on the order of milliseconds. To produce photo-gating, laser 133 may be chosen to be an $Ar^+$ laser operated at 514.5 nm in order to photoionize an upper level $^5D_0$ or $^5D_1$, so that the ionied electrons recombine to a trap. Ref. 15.

Once the material is gated it may then be read by data read pulses, $k_3$, without degrading the stored information (interference pattern). In accordance with the principles of the invention, since the spectral interference pattern is permanently stored in the IBAM, the read pulses, $k_3$, may form a continuous (uninterrupted) data stream, i.e., the data stream need not be broken up into segments to permit periodic storing of the second pulse, $k_2$, information. The read pulses, $k_3$, are also temporally modulated so that they produce an output $K_s$ which is the convolution of the read pulse, $k_3$, and the second input (data) pulse, $k_2$. The detector detects the output $k_s$ which is analyzed according to the application of the optical processor. An illustration of how the output may be used is described in detail in the third embodiment of the invention.

THIRD PREFERRED EMBODIMENT

Inasmuch as the first and second embodiments of the invention perform a convolution or cross-correlation operation, the apparatus may be thought of as a processor since it in fact processes the incoming data streams to perform the desired convolution/cross-correlation. The third embodiment of the invention employs a first processor which comprises the same apparatus as described above in connection with the first or second embodiments of the invention. In accordance with the third embodiment of the invention, a first and second processor, each constituted as for example in FIGS. 4 or 6, are provided to permit encoding/decoding of data streams.

Figure 8A:
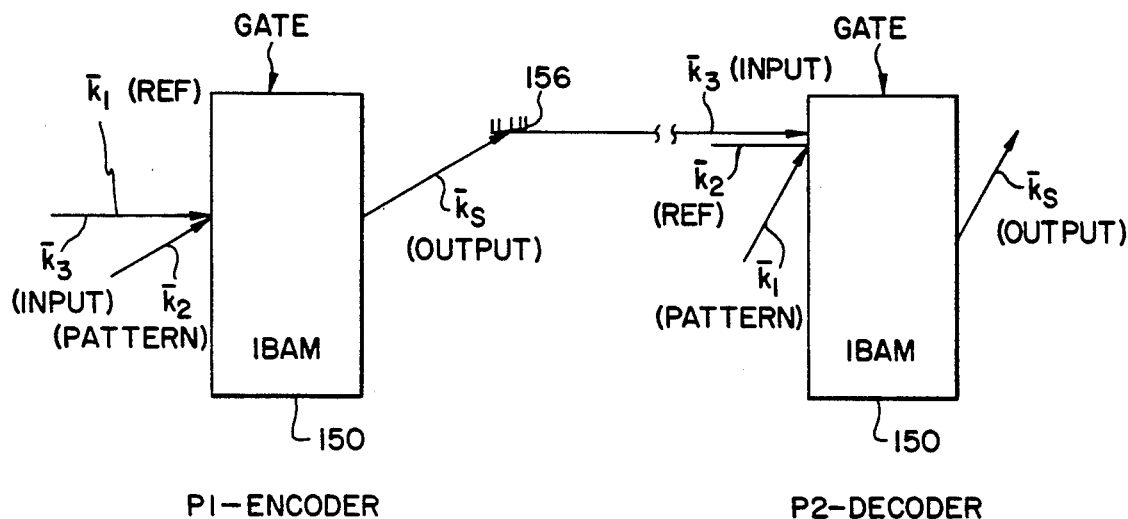
FIGS. 8A and 8B illustrate wave vectors associated with encoding and decoding processors in accordance with a third embodiment of the invention.

FIG. 8A illustrates a first processor p1 which performs the encoding and a second processor p2 which performs the decoding. The two processors may be remotely located with respect to each other in a data communication system.

For simplicity of illustration, the processors p1 and p2 are shown with only the IBAM 150 and the input and output wave vectors. Suitable optics 156 (mirrors for example) may be used to direct the output $k_s$, of the first processor p1 toward the second processor p2. It is understood that the encoding processor p1 may include all the apparatus of, for example, FIG. 4 which is upstream of the photo multiplier tube 50. In one embodiment represented by FIG. 8A, the decoding processor p2 may include all of the apparatus of FIG. 4 so that the decoding processor p2 would contain the apparatus to generate the reference ($k_2$) and pattern ($k_1$) pulses. Processor p2 receives its input pulse $k_3$ from the output pulse $k_s$ of the encoding processor p1.

Figure 8B:
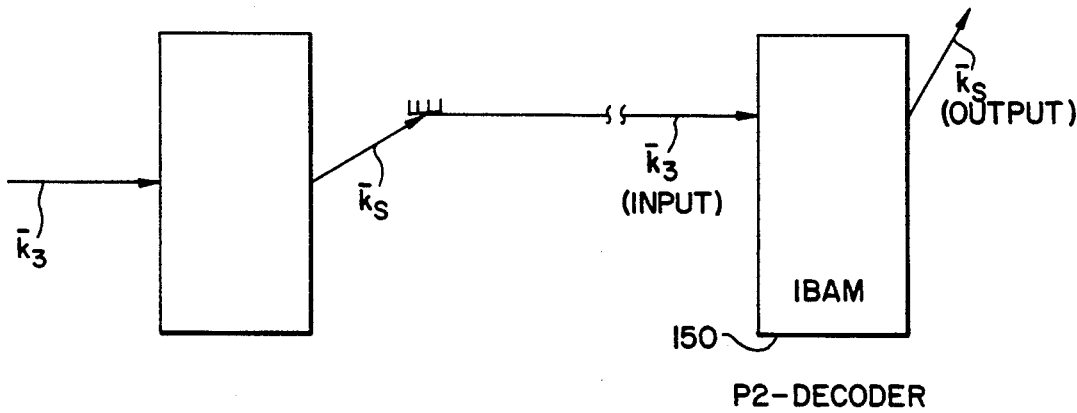

Alternately, as illustrated in FIG. 8B, if only a fixed stored pattern (non-reprogrammable) is desired for the encoding and decoding processors, the processors may be simpler in construction since they need contain only the fixed pattern IBAM 150 and apparatus which is downstream and inclusive of the photo multiplier 50 of FIG. 4. Of course, the fixed pattern IBAM must be created initially in an apparatus such as that shown in FIG. 4, absent the third or reading pulse and the photomultiplier 50 and apparatus downstream thereof. In this latter embodiment of FIG. 8B, the IBAMs 150 of the encoder p1 and decoder p2 are already prepared by exposure to the reference, pattern and gating pulses. The encoding processor p1 and the decoding processor p2 in FIG. 8B need only receive their input signals, $k_3$. The input pulse for the decoding processor p2 is fed to it as the output, $k_s$ of the first processor p1.

In relation to FIG. 6 and FIG. 8A, the encoding processor p1 may include all of the apparatus upstream of the detector 141, and the decoding processor p2 may include all of the apparatus of FIG. 6. Alternately, considering FIGS. 6 and 8B, if the encoding and decoding processor contains only a fixed non-reprogrammable code, the processors p1 and p2 need only contain the apparatus enumerated by elements 135–141 inclusive.

It is understood, of course, that the IBAM 150 of the decoding processor p2 must be programmed in a manner consistent with the programming of the IBAM 50 of the encoding processor p1. To perform the proper convolution/cross-correlation operations, the IBAM 150 of processor p2 stores the spectral interference pattern resulting from switching the order of the first and second input pulses ($k_1$ and $k_2$) from that of the IBAM 150 of the encoding processor p1. Thus, if the encoding processor p1 performs a convolution, the decoding processor p2 performs a cross-correlation and visa versa.

As an example, the case in which the encoding processor performs a correlation is described. During the writing/programming cycle on processor p1, two input pulses, which are temporally separated, illuminate the IBAM 150. The first pulse $k_1$, is temporally brief and acts as the reference pulse. The second pulse $k_2$, is the pattern pulse used for encoding/decoding. An example of a pattern pulse is illustrated in the middle graph of FIG. 9. With momentary reference to FIG. 5, this pattern pulse corresponds to the second input pulse 102, i.e., the first information pulse. In the encoding processor p1 of FIG. 8A, the inputs $k_1$, $k_2$, and $k_3$ are angularly separated as they enter the IBAM 150 sample so that the output signal $k_s$, can be spatially distinguished from the optical data stream during readout as shown in FIG. 8A. As in the first and second embodiments, the output signal direction is given by the phase matching condition $k_s = k_3 + k_2 - k_1$, where $k_s$, $k_2$ and $k_3$ are the wave vectors of the output signal, the reference pulse, the pattern pulse, and the input data stream, respectively. The output signal $k_s$ represents the convolution of the input data stream $k_3$ (the third pulse) with the pattern pulse $k_2$ (the second pulse). If the reference and pattern pulses were temporally switched so that the pattern pulse interacts with the medium first, the output signal would be the cross-correlation of the data stream with the pattern pulse. See Refs. 3, 5, & 12.

Figure 9:
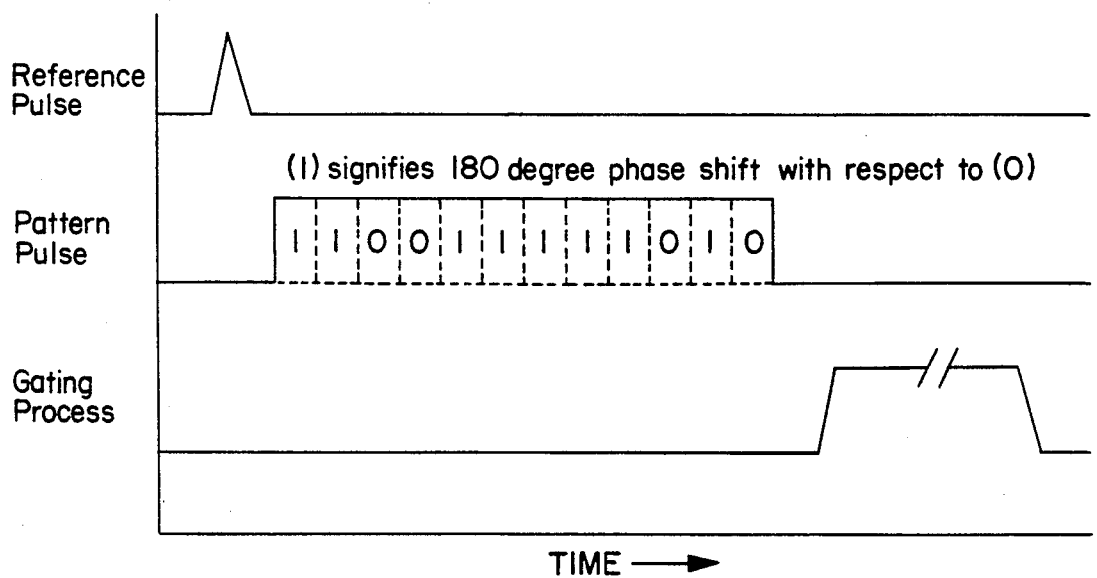
FIG. 9 is a timing diagram illustrating the writing cycle for the third embodiment of the invention.

To further illustrate the encoding/decoding aspect of this third embodiment of the invention, consider a constant amplitude phase encoded pattern pulse which is a 12-bit long sequence represented by "1 1 0 0 1 1 1 1 1 0 1 0" where "1" signifies a 180° phase reversal. This sequence was chosen because it displays a sharp auto-correlation peak. The timing of the input pulses is shown in FIG. 9 which constitutes the writing or storage cycle. The reference pulse, $K_1$, as before, is temporally brief. After the reference, $k_1$, and pattern, $k_2$, pulses have interacted with the medium, the gating process induces the medium to permanently store the spectral interference of the two pulses. The gating pulse may be applied in the same manner as in the first or second embodiments. The IBAM 150 is then ready to process a continuous stream of data to encode same.

Figure 10A:
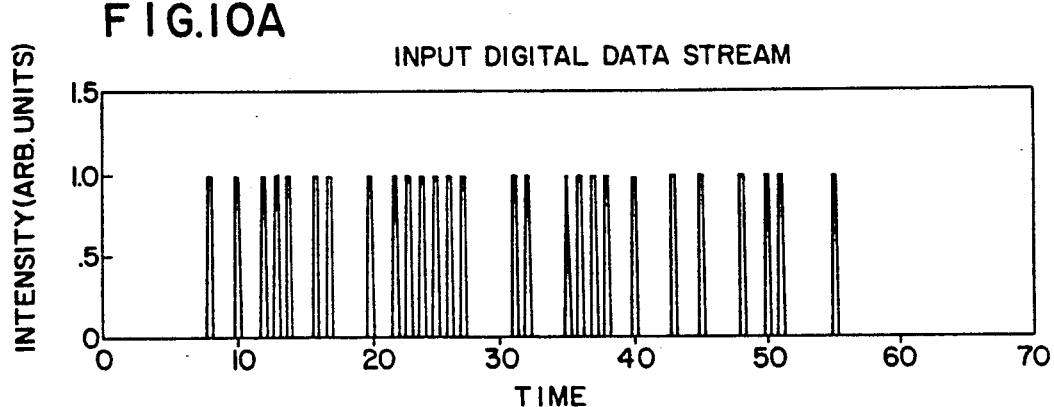
FIGS. 10A-10C illustrate input, encoded and decoded data steams, respectively for the third embodiment of the invention.
Figure 10B:
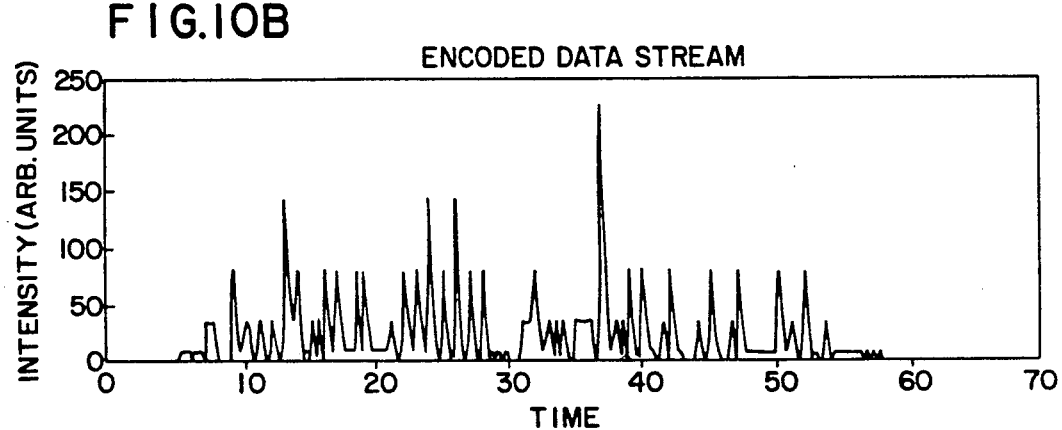

To illustrate the encoding process for the processor p1, a 48-bit input data stream (FIG. 10A), serving as the reading or third pulse, $k_3$, is encoded into an output data stream $K_s$ (FIG. 10B) via intensity modulation. A return-to-zero digital coding is used in this example, with each information bit having a duration equal to two bits of the fixed pattern sequence. This insures that the bandwidth of the input data stream is within the bandwidth of the fixed pattern sequence and no information about the data stream is lost. The electric field of the resultant output signal, $k_s$, (FIG. 10B) represents the convolution of the pattern pulse, $k_2$, (FIG. 9) and the input data stream, $k_3$, (FIG. 10A). The timing of the input data stream $k_3$, and output signal intensity, $k_s$, are shown in FIGS. 10A and 10B respectively. The output signal $k_s$ of FIG. 10B represents the encoded data output stream of the encoding processor p1.

Figure 10C:
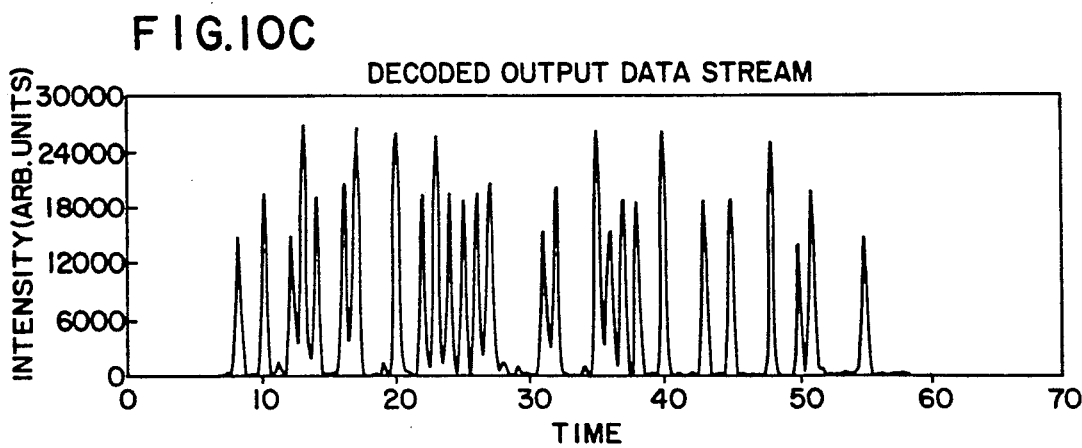

The encoded data output signal $k_s$ of the encoding processor p1 may then be sent to the second or decoding processor p2 which decodes the data stream. As indicated above, the decoding processor p2 is identical to the encoding processor p1 except that the reference and pattern pulses are switched so that the pattern pulse interacts with the IBAM first, followed by the reference pulse (temporally brief) and then followed by a gating operation (i.e., photo-gating) to permanently store the spectral interference. Thus, the encoded data output signal (FIG. 10B) of the processor p1 is now fed to the decoding processor p2, serving as its input data stream resulting in a decoded data output signal (FIG. 10C) which is a cross correlation of the pattern pulse (FIG. 7) with the encoded data output signal (FIG. 10B). The timing of the original data sequence (FIG. 10A) matches that of decoded data output signal intensity (FIG. 10C). Threshold detection allows regeneration of the initial digital data.

FOURTH PREFERRED EMBODIMENT

In a fourth embodiment of the invention the reference pulses in the processors are replaced by pattern pulses resulting in a doubly encoded output signal from the first processor that, when fed into the second processor, is doubly decoded to yield the original data stream. In the case of doubly encoding, the output signal produced in response to the reading pulse (third pulse) is the correlation of the first pulse with the convolution of the second and third pulses. Double encoding is particularly useful in the third embodiment of the invention such as illustrated in FIGS. 8A and 8B.

The pattern pulses are not limited to phase encoding, but can be encoded by any combination of phase, amplitude or frequency modulation (including being frequency chirped with varying chirp widths and rates). Likewise, the data stream can be encoded by any combination of phase, amplitude or frequency modulation. Provided the auto-correlation of the pattern pulses are sufficiently sharp (i.e., the width of the auto-correlation peaks are less than the duration of the shortest temporal feature of the data stream), then the decoded output signal of the second processor will mimic the input data stream of the first, encoding processor in both phase and amplitude.

VARIATIONS OF THE PREFERRED EMBODIMENTS

In order to obtain a high fidelity output signal there must be a minimal bleaching (i.e. saturation) of the spectral grating stored in the medium. It is therefore essential that absorbers in the excited state relax to a unique ground state in a time comparable to the homogenous decay time. For a fixed oscillator strength and density of absorbers, a reduction in this relaxation time permits a higher intensity data input stream, and hence, a higher signal-to-noise ratio. The relaxation time may be artificially shortened by optically pumping absorbers trapped in long lived excited or intermediate metastable states to short lived excited states which quickly decay to the ground state. The optical pumping may be achieved, for example, by using a separate pump laser in FIGS. 4 or 6 with its output directed toward the sample only during the reading pulse or at least only during a substantial portion of the reading pulse. FIG. 4, shows an optical pumping laser 88. In another modification of this embodiment, the optical pumping need not be from a coherent source. The optical pumping does not effect the fixed or permanent reservoir states produced by the gating process.

A temporally brief pulse has the potential to excite all the absorbers within its Fourier transform limited spectral bandwidth. For example, to achieve 100 GHz bandwidths, brief pulses less than 6 ps in duration are employed. However, in order to excite a large fraction of these absorbers into their excited states, the peak power of this brief pulse must be quite large. Such brief, intense pulses can be difficult to produce. An alternate way to excite a large bandwidth of absorbers uniformly is with linearly frequency chirped pulses. The chirp bandwidth must be greater than or equal to the required device bandwidth. However, the duration of these chirped pulses is only limited by the homogeneous decay time. Thus they can be 1000 times longer than the brief pulses and still excite the same bandwidths. This process enables a large number of absorbers to be excited per unit bandwidth with relatively low intensity chirped pulses. As a representative example, the chirped pulses may be produced using current tuning of a semiconductor laser or by introducing an electro-optic timer in a ring dye laser.

In the above embodiments various types of gating processes may be employed. The first and second preferred embodiments described above use light at more than one wavelength to gate the material. The first wavelength generates excited states in the absorber, and the second wavelength causes the excited absorber states to be caught in a trap. The trap may result, for example, from a photochemical process which effectively creates a fixed or permanent reservoir for the excited state of the absorber.

Figure 11A:
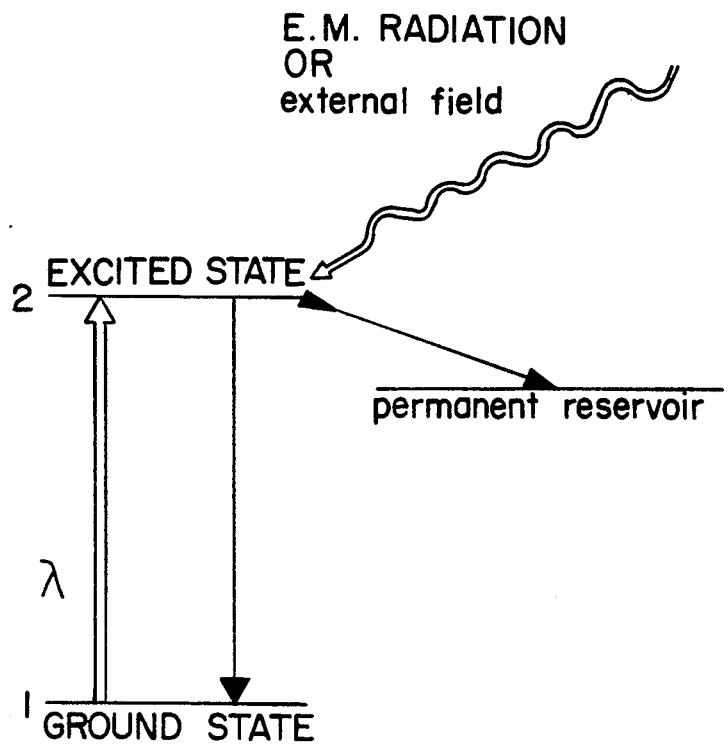
FIGS. 11A and 11B illustrate alternative gating schemes which may be used in accordance with the principles of the invention.

Another type of gating employs the use of an electric field. Electromagnetic radiation with a wave length equal to λ excites the absorber from energy level 1 to energy level 2. If while the absorber is in the excited state an electric field is present, the material undergoes a transformation altering the excited absorber state. If the read operation is preformed while the external field is not present, the reading pulse of electromagnetic radiation is non-destructive. FIG. 11A illustrates the gating process using an electromagnetic pulse or a static E field.

Figure 11B:
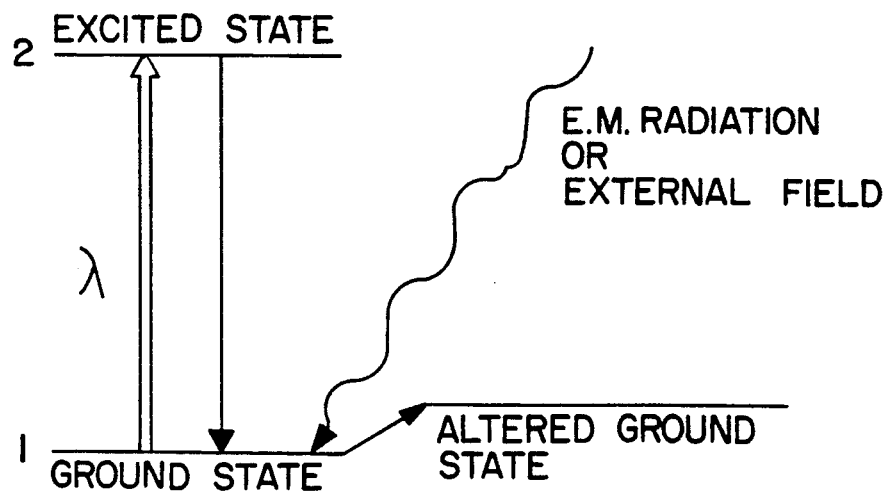
Figure 12A:
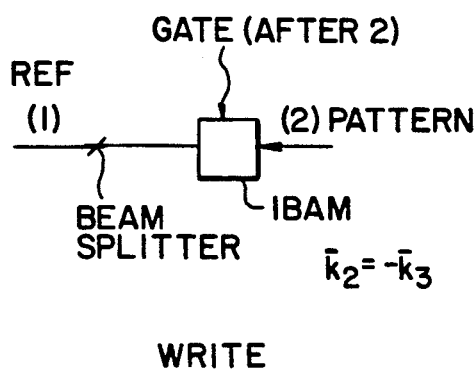
FIGS. 12a and 12b illustrate wave vector diagrams for write and read operations of one embodiment of the invention.
Figure 12B:
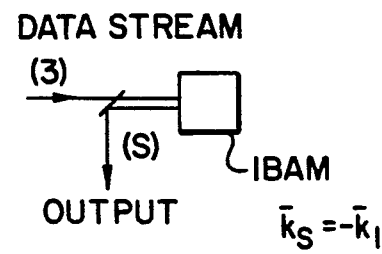
Figure 13A:
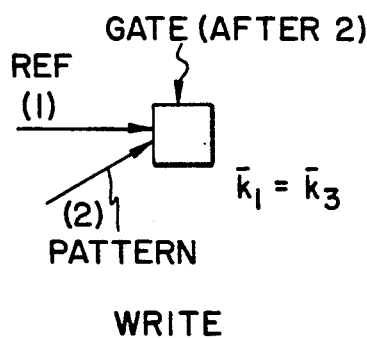
FIGS. 13a and 13b illustrate wave vector diagrams for write and read operations of another embodiment of the invention.
Figure 13B:
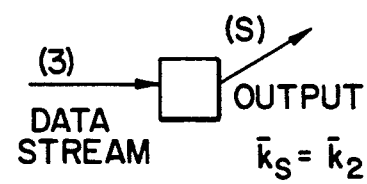
Figure 14A:
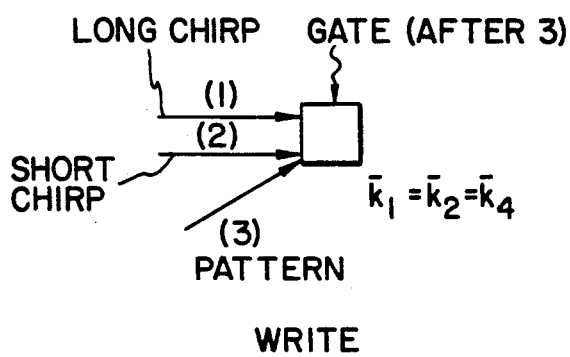
FIGS. 14a and 14b illustrate wave vector diagrams for write and read operations of an embodiment of the invention which utilizes chirped pulses.
Figure 14B:
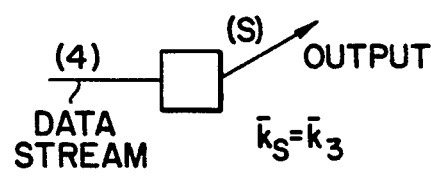

The gating processes thus far described and illustrated in FIG. 11A have all involved preventing the excited absorbers from returning to their ground states thus preserving the non-thermal ground state frequency distribution. Alternately, as shown in FIG. 11B, one may use a gating process that alters all the ground state absorbers (i.e., absorbers which are not excited but remain in their ground state) such that they no longer absorb at the same wavelength as the input pulses. Altering the ground state absorbers may be done while leaving the excited state unperturbed. In this process once the ground state absorbers have been altered, the gating process is stopped, and those absorbers in their excited states decay to their ground state (the original, unaltered ground state). The excited state decay time must be longer than the time it takes for the gating process to alter the ground state absorbers in order for the process to be efficient. One method of accomplishing this is by using several write cycles for a period of between a microsecond to a few seconds.

If the application of the optical signal processor only requires a relatively short amount of uninterrupted data to be processed then the gating process may not be necessary. Certain materials exhibit relatively long periods of storage retention even during successive reading operations. In a alternative embodiment such a material may be used instead of gating the material. This apparatus could use the same set up as in FIGS. 4 or 6. In this embodiment the absorbing medium could be $Eu:Y_2O_3$ which has multiple ground states in the form of hyperfine levels. For example, this material may be read on the order of 100 times without having to re-enter the stored data.

It may also be desirable that the stored spectral pattern be reprogrammable. This may be achieved by a reversible gating process. When a new pattern is desired, the old information can be erased and a new pattern programmed into the medium. This can be accomplished by introducing an erasing pulse that excites the absorbers that are in trapped states and restores them to their original unaltered states after relaxation. In the case of $BaClF:Sm^{2+}$, with $Sm^{3+}$ traps, the writing pulses are at 687.9 nm (red). Gating is accomplished by introducing green light that photoionizes the excited $Sm^{2+}$ ions changing them to $Sm^{3+}$. The freed electron is trapped by a $Sm^{3+}$ which changes to a $Sm^{2+}$. Erasure occurs when blue light is introduced that photoionizes the $Sm^{2+}$ traps, freeing the electron which then returns back to the original ion, changing it from $Sm^{3+}$ to $Sm^{2+}$.

If the gating process is nonreversible, then an array of patterns may be stored in the IBAM and accessed spatially. Storage densities greater than $10^4$ stored patterns per $cm^3$ may be achieved. Therefore, a large set of orthogonal patterns (Barker codes for example) may be stored at different spatial locations on a 1 $cm^2$ chip (5 mm thick) and randomly accessed by electro-optic or acousto-optic deflection techniques. For example, a 5 mm thick, one centimeter square solid may store $10^4$ patterns with laser spot sizes as large as 100 microns in diameter.

Other embodiments of the invention are illustrated in FIGS. 12-15 which illustrate the case of convolutions. In these figures, FIGS. 12A and 13A correspond to the write cycle and FIGS. 12B and 13B correspond to the read cycle. The case of FIGS. 13A and 13B is essentially the same as in the encoder p1 of FIG. 8A.

For correlations, the first and second pulses are switched. For double convolution/correlations the reference pulse is replaced with an additional pattern pulse.

The brief pulse can be replaced with two chirped pulses as illustrated in FIGS. 14-17. These figures likewise illustrate the convolution case in which the reference pulse is the first pulse. This reference pulse is now replaced with two chirped pulses, labeled 1 and 2 in the figures. The first pulse is twice the duration of the second pulse but is chirped over the same chirp bandwidth (i.e., the chirp rate of the first pulse is half that of the second pulse). For the configuration illustrated in FIGS. 14A and 14B, the output signal, s, corresponding to wave vector $k_s$, may overlap with spurious signals. This potential problem of overlap is removed by employing the configurations of FIGS. 15-17.

While in the embodiments described above, the input pulses are described as being optical, there is no constraint on the wavelength of the electromagnetic radiation that excites the sample other than an inhomogeneously broadened absorption line exist at that wavelength.

SUMMARY

The essential features of the gating process and gated materials are as follows:

1) The gating process must alter those atoms in the excited or ground state such that after all the absorbers in the medium have relaxed, an interference grating remains in the ground state spectral population distribution. Examples of alterations include dissociation, a photochemical reaction, ionization, or an environmental change that alters the absorption spectrum.

2) The absorption band of the altered absorbers does should not overlap appreciably with the transition of the unaltered absorbers which are excited by the continuous data stream.

3) After the gating process is complete, all unaltered absorbers must eventually relax to the original ground state in which the spectral grating was written.

The third condition is most easily met by the absorbers having a unique (singlet) ground state. However, it may be possible to have multiple ground states, provided that there is a means by which the original ground state is repopulated. This means could be for example a rf mixing field or thermal redistribution. If this means of repopulating is not provided, the pattern information will be slowly degraded (not really erased since it could be reestablished by population mixing.)

The material chosen for producing the cooperatively enhanced radiation could be ions or molecules doped into crystals, glasses, polymers, matrices or fibers.

Materials such as $Eu:Y_2O_3$, which has multiple ground states (hyperfine levels) could be used directly to store the non-thermal population distribution pattern without gating. However, the pattern information would be slowly erased by the data stream and could not be restored by population mixing.

The intensity of the data stream must be set low enough that the medium does not become saturated. This is equivalent to requiring that the pulse area seen by any given absorber in the medium due to the data stream in a time roughly equal to the relaxation time of the excited state to the original ground state must be much less than pi ($\pi$). Saturation of the medium can lead to distortion of the output signal.

Trade-offs in oscillator strength decay times, concentration of the absorber interaction length and the spot size of the illuminating beams can be made to maintain a non-saturating condition, an absorption length of approximately one (to maximize the output signal), and a sufficient signal to noise in the output.

What is claimed is:

1. Apparatus for performing the operations of cross-correlation or convolution on one or more segments of information, comprising:
   a) at least one source of electromagnetic radiation,
   b) means for modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse,
   c) a sample of absorbers which emits cooperatively enhanced radiation subsequent to excitation by pulses of electromagnetic radiation,
   d) means for exposing said sample in sequence to said first and then to said second input pulses so as to produce a spectral interference pattern resulting in a non-thermal frequency distribution of ground state absorbers within said sample,
   e) a gating device operative on said sample which causes said spectral interference pattern to be one of (1) permanently stored in said sample and (2) reversibly stored in said sample, thereby producing a gated sample,
   f) means for modulating said electromagnetic radiation to produce a third input pulse of electromagnetic radiation, said third input pulse being a second information input pulse, said second information input pulse being time varying in accordance with said one or more segments of information, and having a time duration greater than zero and not greater than the time duration for erasure of the non-thermal frequency distribution of the ground state absorbers of said sample,
   g) means for exposing said gated sample to said third input pulse to stimulate said cooperatively enhanced electromagnetic radiation, and
   h) means for detecting said cooperatively enhanced electromagnetic radiation as a representation of the result of said cross-correlation or convolution operations.

2. Apparatus as recited in claim 1, wherein:
said at least one source of electromagnetic radiation comprises at least one source of optical radiation,
said means for modulating for producing said first, second and third input pulses comprises means for modulating said optical radiation, and
wherein said absorbers emit cooperatively enhanced radiation subsequent to excitation by pulses of optical radiation.

3. Apparatus as recited in claim 2 wherein said sample of absorbers comprises an inhomogeneously broadened optical absorbing material.

4. Apparatus as recited in claim 3, wherein said at least one source of optical radiation comprises at least one source of optically coherent radiation.

5. Apparatus as recited in claim 3, wherein said at least one source of optical radiation comprises a laser.

6. Apparatus as recited in claim 1 wherein said first input pulse is said first information input pulse and said apparatus performs a cross-correlation operation.

7. Apparatus as recited in claim 1 wherein said second input pulse is said first information input pulse and said apparatus performs a convolution operation.

8. Apparatus as recited in claim 1 wherein said modulation means performs amplitude modulation of said first, second and third input pulses.

9. Apparatus as recited in claim 1 wherein said modulation means performs phase modulation of said first, second and third input pulses.

10. Apparatus as recited in claim 1 wherein said modulation means performs frequency modulation of said first, second and third input pulses.

11. Apparatus as recited in claim 1, wherein said at least one source of electromagnetic radiation comprises at least one source of optically coherent radiation.

12. Apparatus as recited in claim 1, wherein said at least one source of electromagnetic radiation comprises a laser.

13. Apparatus as recited in claim 1 wherein said sample of absorbers is of solid form.

14. Apparatus as recited in claim 1, further comprising means for exposing said absorbers to a source of electromagnetic radiation during said third input pulse for causing metastable excited states of said absorbers to transition to excited states having a relatively short lifetime for ground state transitions.

15. Apparatus as recited in claim 14, wherein said relatively short lifetimes for ground state transitions are on the order of or shorter than a homogenous decay time of said absorbers.

16. Apparatus as recited in claim 1 wherein said first information input pulse comprises a chirped pulse.

17. Apparatus as recied in claim 1 wherein said first reference pulse comprises a first and second chirped pulse, said second chirped pulse having a chirp rate twice that of the first chirped pulse.

18. Apparatus for performing the operations of cross-correlation, convolution or combinations thereof on one or more segments of information, comprising:
   a) at least one source of electromagnetic radiation,
   b) means for modulating said electromagnetic radiation to produce first and second input pulses of electromagnetic radiation, corresponding respectively to a first and second information input pulse, said first and second information input pulse being time varying in accordance with said one or more segments of information,
   c) a sample of absorbers which emits cooperatively enhanced radiation subsequent to excitation by pulses of electromagnetic radiation,
   d) means for exposing said sample in sequence to said first and then to said second input pulses so as to produce a spectral interference pattern resulting in a non-thermal frequency distribution of ground state absorbers within said sample,
   e) a gating device operative on said sample which causes said spectral interference pattern to be one of (1) permanently stored in said sample and (2) reversibly stored in said sample, thereby producing a gated sample, f) means for modulating said electromagnetic radiation to produce a third input pulse of electromagnetic radiation, said third input pulse being a third information input pulse, said third information input pulse being time varying in accordance with said one or more segments of information, and having a time duration greater than zero and not greater than the time duration for erasure of the non-thermal frequency distribution of the ground state absorbers of said sample, g) means for exposing said gated sample to said third input pulse to stimulate said cooperatively enhanced electromagnetic radiation, and h) means for detecting said cooperatively enhanced electromagnetic radiation as a representation of the result of said operations of cross-correlation, convolution or combinations thereof.

19. Apparatus as recited in claim 18, wherein said first and second information pulses comprise chirped pulses.

20. A method for performing the operations of cross-correlation or convolution on one or more segments of information, comprising:

a) providing a source of electromagnetic radiation, b) modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse, c) providing a sample of absorbers which emits cooperatively enhanced radiation subsequent to excitation by pulses of electromagnetic radiation, d) exposing said sample in sequence to said first and then to said second input pulses so as to produce a spectral interference pattern resulting in a non-thermal frequency distribution of ground state absorbers within said sample, e) exposing said sample to a gating signal which causes said spectral interference pattern to be one of (1) permanently stored in said sample and (2) reversibly stored in said sample, thereby producing a gated sample, f) modulating said electromagnetic radiation to produce a third input pulse of electromagnetic radiation, said third input pulse being a second information input pulse, said second information input pulse being time varying in accordance with said one or more segments of information, and having a time duration greater than zero and not greater than the time duration for erasure of the non-thermal frequency distribution of the ground state absorbers of said sample, g) exposing said gated sample to said third input pulse to stimulate said cooperatively enhanced electromagnetic radiation, and h) detecting said cooperatively enhanced electromagnetic radiation as a representation of the result of said cross-correlation or convolution operations.

21. The method as recited in claim 20 wherein said step of exposing said sample to a gating signal comprises altering excited states of said absorbers.

22. The method as recited in claim 20 wherein said step of exposing said sample to a gating signal comprises altering the ground state of said absorbers.

23. The method as recited in claim 20 wherein said exposing steps d) and g) include directing said first, second and third input pulses along directions characterized by wave vectors $k_1$, $k_2$, and $k_3$ respectively, and said detecting step h) includes detecting said cooperatively enhanced radiation along a direction characterized by wave vector $k_s$, and the following phase matching condition is satisfied:

$$|\vec{k}_s| = \omega_s/c$$

where, $$\vec{k}_s = \vec{k}_3 \pm (\vec{k}_2 - \vec{k}_1)$$

wherein $\omega_s$ is the frequency of the cooperatively enhanced radiation and c is the speed of light.

24. The method as recited in claim 23 wherein said sample of absorbers is of solid form and said detecting step h) includes detecting said cooperatively enhanced radiation along a direction characterized by, $$\vec{K}_s = \vec{k}_3 + (\vec{k}_2 - \vec{k}_1)$$

25. A method for performing the operations of cross-correlation or convolution on one or more segments of information, comprising:

a) providing a source of electromagnetic radiation, b) modulating said electromagnetic radiation to produce first and second input pulses of electromagnetic radiation, corresponding to first and second information input pulses, said first and second information input pulse being time varying in accordance with said one or more segments of information, c) providing a sample of absorbers which emits cooperatively enhanced radiation subsequent to excitation by pulses of electromagnetic radiation, d) exposing said sample in sequence to said first and then to said second input pulses so as to produce a spectral interference pattern resulting in a non-thermal frequency distribution of ground state absorbers within said sample, e) exposing said sample to a gating signal which causes said spectral interference pattern to be one of (1) permanently stored in said sample and (2) reversibly stored in said sample, thereby producing a gated sample, f) modulating said electromagnetic radiation to produce a third input pulse of electromagnetic radiation, said third input pulse being a third information input pulse, and being time varying in accordance with said one or more segments of information, and having a time duration greater than zero and not greater than the time duration for erasure of the non-thermal frequency distribution of the ground state absorbers of said sample, g) exposing said gated sample to said third input pulse to stimulate said cooperatively enhanced electromagnetic radiation, and h) detecting said cooperatively enhanced electromagnetic radiation as a representation of the result of said operations of cross-correlation, convolution or combinations thereof.

26. A method as recited in claim 25 wherein said at least one of said first and second information pulses comprises at least one chirped pulse.

27. Apparatus for encoding and decoding information by performing the operations of cross-correlation or convolution on one or more segments of information, comprising:
an encoder including:
 a) at least one source of electromagnetic radiation,
 b) means for modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse,
 c) a sample of absorbers which emits cooperatively enhanced radiation subsequent to excitation by pulses of electromagnetic radiation,
 d) means for exposing said sample in sequence to said first and then to said second input pulses so as to produce a spectral interference pattern resulting in a non-thermal frequency distribution of ground state absorbers within said sample,
 e) a gating device operative on said sample which causes said spectral interference pattern to be one of (1) permanently stored in said sample and (2) reversibly stored in said sample, thereby producing a gated sample,
 f) means for modulating said electromagnetic radiation to produce a third input pulse of electromagnetic radiation, said third input pulse being a second information input pulse, said second information input pulse being time varying in accordance with said one or more segments of information, and having a time duration greater than zero and not greater than the time duration for erasure of the non-thermal frequency distribution of the ground state absorbers of said sample,
 g) means for exposing said gated sample to said third input pulse to stimulate said cooperatively enhanced electromagnetic radiation, to thereby encode said second information input pulse to produce encoded information, and
2) a decoder including:
 a) at least one source of electromagnetic radiation,
 b) means for modulating said electromagnetic radiation to produce additional first and additional second input pulses of electromagnetic radiation identical respectively to said first and second input pulses,
 c) an additional sample of absorbers which emits cooperatively enhanced radiation subsequent to excitation by pulses of electromagnetic radiation,
 d) means for exposing said additional sample in sequence to said second additional input pulse and then to said first additional input pulse so as to produce a spectral interference pattern resulting in a non-thermal frequency distribution of ground state absorbers within said additional sample,
 e) a gating device operative on said additional sample which causes said spectral interference pattern to be one of (1) permanently stored in said sample and (2) reversibly stored in said sample, thereby producing an additional gated sample,
 f) means for exposing said additional gated sample to said cooperatively enhanced electromagnetic radiation from said encoder to stimulate additional cooperatively enhanced electromagnetic radiation from said additional gated sample, to thereby decode said cooperatively enhanced electromagnetic radiation from said encoder, and
 g) means for detecting said additional cooperatively enhanced electromagnetic radiation from said decoder as a representation of said first information input pulse.

28. Apparatus as recited in claim 27 wherein said first and said additional first input pulses each comprise a chirped pulse.

29. Apparatus as recied in claim 27 wherein said first and said additional first reference pulses each comprise a first and second chirped pulse, said second chirped pulse having a chirp rate twice that of the first chirped pulse.

30. Apparatus as recited in claim 27 wherein said first and said additional first information pulses each comprise at least one chirped pulse.

31. Apparatus for encoding and decoding information by performing the operations of cross-correlation, convolution or combinations thereof on one or more segments of information, comprising:
1) an encoder including:
 a) at least one source of electromagnetic radiation,
 b) means for modulating said electromagnetic radiation to produce first and second input pulses of electromagnetic radiation, corresponding respectively to first and second information input pulse, and representative of said one or more segments of information,
 c) a sample of absorbers which emits cooperatively enhanced radiation subsequent to excitation by pulses of electromagnetic radiation,
 d) means for exposing said sample in sequence to said first and then to said second input pulses so as to produce a spectral interference pattern resulting in a non-thermal frequency distribution of ground state absorbers within said sample,
 e) a gating device operative on said sample which causes said spectral interference pattern to be one of (1) permanently stored in said sample and (2) reversibly stored in said sample, thereby producing a gated sample,
 f) means for modulating said electromagnetic radiation to produce a third input pulse of electromagnetic radiation, said third input pulse being a third information input pulse, said third information input pulse being representative of said one or more segments of information, and having a time duration greater than zero and not greater than the time duration for erasure of the non-thermal frequency distribution of the ground state absorbers of said sample,
 g) means for exposing said gated sample to said third input pulse to stimulate said cooperatively enhanced electromagnetic radiation, to thereby encode said second information input pulse to produce encoded information, and 2) a decoder including:
   a) at least one source of electromagnetic radiation,
   b) means for modulating said electromagnetic radiation to produce additional first and additional second input pulses of electromagnetic radiation identical respectively to said first and second input pulses,
   c) an additional sample of absorbers which emits cooperatively enhanced radiation subsequent to excitation by pulses of electromagnetic radiation,
   d) means for exposing said additional sample in sequence to said second additional input pulse and then to said first additional input pulse so as to produce a spectral interference pattern resulting in a non-thermal frequency distribution of ground state absorbers within said additional sample,
   e) a gating device operative on said additional sample which causes said spectral interference pattern to be one of (1) permanently stored in said sample and (2) reversibly stored in said sample, thereby producing an additional gated sample,
   f) means for exposing said additional gated sample to said cooperatively enhanced electromagnetic radiation from said encoder to stimulate additional cooperatively enhanced electromagnetic radiation from said additional gated sample, to thereby decode said cooperatively enhanced electromagnetic radiation from said encoder, and
   g) means for detecting said additional cooperatively enhanced electromagnetic radiation from said decoder as a representation of said first information input pulse.

32. Apparatus for encoding information by performing the operations of cross-correlation or convolution on one o more segments of information, comprising:
   a) at least one source of electromagnetic radiation,
   b) means for modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse,
   c) a sample of absorbers which emits cooperatively enhanced radiation subsequent to excitation by pulses of electromagnetic radiation,
   d) means for exposing said sample in sequence to said first and then to said second input pulses so as to produce a spectral interference pattern resulting in a non-thermal frequency distribution of ground state absorbers within said sample,
   e) a gating device operative on said sample which causes said spectral interference pattern to be one of (1) permanently stored in said sample and (2) reversibly stored in said sample, thereby producing a gated sample,
   f) means for modulating said electromagnetic radiation to produce a third input pulse of electromagnetic radiation, said third input pulse being a second information input pulse, said second information input pulse being time varying in accordance with said one or more segments of information, and having a time duration greater than zero and not greater than the time duration for erasure of the non-thermal frequency distribution of the ground state absorbers of said sample, and
   g) means for exposing said gated sample to said third input pulse to stimulate said cooperatively enhanced electromagnetic radiation, to thereby encode said second information input pulse to produce encoded information.

33. Apparatus for encoding information by performing the operations of cross-correlation, convolution or combinations thereof on one or more segments of information, comprising:
   a) at least one source of electromagnetic radiation,
   b) means for modulating said electromagnetic radiation to produce first and second input pulses of electromagnetic radiation, corresponding respectively to first and second information input pulse representative of said one or more segments of information,
   c) a sample of absorbers which emits cooperatively enhanced radiation subsequent to excitation by pulses of electromagnetic radiation,
   d) means for exposing said sample in sequence to said first and then to said second input pulses so as to produce a spectral interference pattern resulting in a non-thermal frequency distribution of ground state absorbers within said sample,
   e) a gating device operative on said sample which causes said spectral interference pattern to be one of (1) permanently stored in said sample and (2) reversibly stored in said sample, thereby producing a gated sample,
   f) means for modulating said electromagnetic radiation to produce a third input pulse of electromagnetic radiation, said third input pulse being a third information input pulse representative of said one or more segments of information, and having a time duration greater than zero and not greater than the time duration for erasure of the non-thermal frequency distribution of the ground state absorbers of said sample, and
   g) means for exposing said gated sample to said third input pulse to stimulate said cooperatively enhanced electromagnetic radiation, to thereby encode said second information input pulse to produce encoded information.

34. A method of encoding on one or more segments of information, comprising:
   a) providing at least one source of electromagnetic radiation,
   b) modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse,
   c) providing a sample of absorbers which emits cooperatively enhanced radiation subsequent to excitation by pulses of electromagnetic radiation,
   d) exposing said sample in sequence to said first and then to said second input pulses so as to produce a spectral interference pattern resulting in a non-thermal frequency distribution of ground state absorbers within said sample, e) exposing said sample to a gating signal which causes said spectral interference pattern to be one of (1) permanently stored in said sample and (2) reversibly stored in said sample, thereby producing a gated sample, f) modulating said electromagnetic radiation to produce a third input pulse of electromagnetic radiation, said third input pulse being a second information input pulse, said second information input pulse being time varying in accordance with said one or more segments of information, and having a time duration greater than zero and not greater than the time duration for erasure of the non-thermal frequency distribution of the ground state absorbers of said sample, and g) exposing said gated sample to said third input pulse to stimulate said cooperatively enhanced electromagnetic radiation, to thereby encode said second information input pulse to produce encoded information.

35. Apparatus for performing the operations of cross-correlation or convolution on one or more segments of information, comprising:

a) at least one source of electromagnetic radiation, b) means or modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse, c) a sample of absorbers which emits cooperatively enhanced radiation subsequent to excitation by pulses of electromagnetic radiation, d) means for exposing said sample in sequence to said first and then to said second input pulses so as to produce a spectral interference pattern which induces transitions in said absorbers resulting in a non-thermal frequency distribution of ground state absorbers within said sample, e) a gating device operative on said sample which causes said non-thermal frequency distribution to be one of (1) permanently stored in said sample and (2) reversibly stored in said sample, thereby producing a gated sample, f) means for modulating said electromagnetic radiation to produce a third input pulse of electromagnetic radiation, said third input pulse being a second information input pulse, said second information input pulse being time varying in accordance with said one or more segments of information, and having a time duration greater than the homogeneous relaxation time of the transitions;

g) means for exposing said gated sample to said third input pulse to stimulate said cooperatively enhanced electromagnetic radiation, and h) means for detecting said cooperatively enhanced electromagnetic radiation as a representation of the result of said cross-correlation or convolution operations.

36. A method for performing the operations of cross-correlation or convolution on one or more segments of information, comprising:

a) providing at least one source of electromagnetic radiation b) modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse, c) providing a sample of absorbers which emits cooperatively enhanced radiation subsequent to excitation by pulses of electromagnetic radiation, d) exposing said sample in sequence to said first and then to said second input pulses so as to produce a spectral interference pattern which induces transitions in said absorbers resulting in a non-thermal frequency distribution of ground state absorbers within said sample, e) exposing said sample to a gating signal which causes said non-thermal frequency distribution to be one of (1) permanently stored in said sample and (2) reversibly stored in said sample, thereby producing a gated sample, f) modulating said electromagnetic radiation to produce a third input pulse of electromagnetic radiation, said third input pulse being a second information input pulse, said second information input pulse being time varying in accordance with said one or more segments of information, and having a time duration greater than the homogeneous relaxation time of the transitions;

g) exposing said gated sample to said third input pulse to stimulate said cooperatively enhanced electromagnetic radiation, and h) detecting said cooperatively enhanced electromagnetic radiation as a representation of the result of said cross-correlation or convolution operations.

37. Apparatus for performing the operations of cross-correlation or convolution on one or more segments of information, comprising:

a) at least one source of electromagnetic radiation, b) means or modulating said electromagnetic radiation to produce first and second input pulses of electromagnetic radiation, one of which is a first information input pulse composed of a series of information signals, and the other of which is a reference pulse, said first information input pulse being time varying in accordance with said one or more segments of information, and said reference pulse being temporally brief in relation to the duration of the shortest information signals which make up the first information input pulse, c) a sample of absorbers which emits cooperatively enhanced radiation subsequent to excitation by pulses of electromagnetic radiation, d) means for exposing said sample in sequence to said first and then to said second input pulses so as to produce a spectral interference pattern which induces transitions in said absorbers resulting in a non-thermal frequency distribution of ground state absorbers within said sample, e) a gating device operative on said sample which causes said non-thermal frequency distribution to be one of (1) permanently stored in said sample and (2) reversibly stored in said sample, thereby producing a gated sample, f) means for modulating said electromagnetic radiation to produce a third input pulse of electromagnetic radiation, said third input pulse being a second information input pulse, said second information input pulse being time varying in accordance with said one or more segments of information, and having a time duration which is not limited by the homogeneous relaxation time of the transitions of said absorbers but only by the time of erasure of the non-thermal frequency distribution of the ground state absorbers;

g) means for exposing said gated sample to said third input pulse to stimulate said cooperatively enhanced electromagnetic radiation, and h) means for detecting said cooperatively enhanced electromagnetic radiation as a representation of the result of said cross-correlation or convolution operations.

* * * * *